US012658588B2

(12) United States Patent
Xue et al.

(10) Patent No.: US 12,658,588 B2
(45) Date of Patent: Jun. 16, 2026

(54) ANTENNA SYSTEM AND ELECTRONIC DEVICE

(71) Applicant: Huawei Technologies Co., Ltd., Shenzhen (CN)

(72) Inventors: Liang Xue, Shanghai (CN); Meng Hou, Shanghai (CN); Hanyang Wang, Reading (GB); Pengfei Wu, Shanghai (CN); Chuanbo Shi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 317 days.

(21) Appl. No.: 18/682,612

(22) PCT Filed: Aug. 3, 2022

(86) PCT No.: PCT/CN2022/109988
§ 371 (c)(1),
(2) Date: Feb. 9, 2024

(87) PCT Pub. No.: WO2023/016313
PCT Pub. Date: Feb. 16, 2023

(65) Prior Publication Data

US 2024/0356228 A1 Oct. 24, 2024

(30) Foreign Application Priority Data

Aug. 11, 2021 (CN) ......................... 202110919516.6

(51) Int. Cl.
*H01Q 9/04* (2006.01)
*H01Q 1/24* (2006.01)

(52) U.S. Cl.
CPC ........... *H01Q 9/0421* (2013.01); *H01Q 1/243* (2013.01); *H01Q 9/0442* (2013.01)

(58) Field of Classification Search
CPC .... H01Q 9/0421; H01Q 1/243; H01Q 9/0442; H01Q 1/521; H01Q 5/321; H01Q 5/328; H01Q 5/371; H01Q 13/10; H01Q 21/28
See application file for complete search history.

(56) References Cited

U.S. PATENT DOCUMENTS 5,977,916 A * 11/1999 Vannatta .............. H01Q 9/0421 343/702
9,509,042 B1 * 11/2016 Zheng ...................... H01Q 1/48
(Continued)

FOREIGN PATENT DOCUMENTS

CN 106972257 A 7/2017
CN 109980364 A 7/2019
(Continued)

*Primary Examiner* — Dimary S Lopez Cruz
*Assistant Examiner* — Bamidele A Immanuel
(74) *Attorney, Agent, or Firm* — Slater Matsil, LLP

(57) ABSTRACT

In some embodiments, an antenna system includes a first antenna and a second antenna. The first and second antenna include a shared first radiator and an additional radiator. Two ends of the first radiator are connected to a ground, each radiator has a first end farther from a first end of the other radiator, and the first end of the second radiator and the first end of the third radiator are separately connected to the first radiator. The second end of the second radiator is disposed opposite a gap to the second end of the third radiator. The first antenna is through a first feeding connection on the second radiator, and the second antenna is through a second feeding connection on the third radiator.

19 Claims, 22 Drawing Sheets

(56) References Cited

U.S. PATENT DOCUMENTS

| | | | | |
|---|---|---|---|---|
| 10,608,691 | B1 * | 3/2020 | Zheng | H01Q 1/243 |
| 2008/0174508 | A1 * | 7/2008 | Iwai | H01Q 9/30 343/850 |
| 2009/0027286 | A1 * | 1/2009 | Ohishi | H01Q 1/521 343/750 |
| 2013/0162496 | A1 * | 6/2013 | Wakabayashi | H01Q 1/38 343/893 |
| 2013/0271345 | A1 * | 10/2013 | Tang | H01Q 1/521 343/893 |
| 2014/0035788 | A1 * | 2/2014 | Choi | H01Q 5/335 343/749 |
| 2015/0061962 | A1 * | 3/2015 | Lee | H01Q 9/42 343/893 |
| 2016/0049719 | A1 | 2/2016 | Tseng et al. | |
| 2016/0248163 | A1 * | 8/2016 | Pan | H01Q 9/42 |
| 2016/0285159 | A1 * | 9/2016 | Caporal Del Barrio | H01Q 1/38 |
| 2016/0336643 | A1 | 11/2016 | Pascolini et al. | |
| 2018/0090850 | A1 * | 3/2018 | Lee | H01Q 21/30 |
| 2018/0183132 | A1 * | 6/2018 | Wong | H01Q 7/00 |
| 2019/0372215 | A1 * | 12/2019 | Lee | H01Q 5/378 |
| 2021/0111486 | A1 * | 4/2021 | Tamrakar | H01Q 9/42 |
| 2023/0163457 | A1 * | 5/2023 | Tsai | H01Q 1/243 343/893 |

FOREIGN PATENT DOCUMENTS

| | | | | | |
|---|---|---|---|---|---|
| CN | 111276796 | A | * | 6/2020 | H01Q 1/36 |
| CN | 210723351 | U | * | 6/2020 | |
| CN | 210723352 | U | * | 6/2020 | |
| CN | 111403903 | A | * | 7/2020 | H01Q 1/36 |
| CN | 111628298 | A | | 9/2020 | |
| CN | 112086753 | A | * | 12/2020 | H01Q 1/50 |
| CN | 113224503 | A | * | 8/2021 | H01Q 1/521 |
| CN | 110829023 | B | * | 11/2021 | H01Q 1/50 |
| CN | 114512800 | A | * | 5/2022 | H01Q 1/36 |
| JP | 2019205090 | A | | 11/2019 | |

* cited by examiner

| Single antenna with a closed slit in a reference design | | |
|---|---|---|
| Input power 24 dBm | Resonant frequency | 2 GHz |
| Normalized efficiency | FS normalization | –5 |
| Normalized SAR value | Back –5 mm | 1.40 |
| | Bottom –5 mm | 0.51 |

FIG. 9a

| Antenna system in this embodiment of this application with a closed slit whose length is 40 mm | | |
|---|---|---|
| Input power 24 dBm | Resonant frequency = 2 GHz | ANT 1 |
| Normalized efficiency | FS normalization | –5 |
| Normalized SAR value | Back –5 mm | 1.37 |
| | Bottom –5 mm | 1.10 |

FIG. 9b

| Antenna system in this embodiment of this application with a closed slit whose length is 70 mm | | |
|---|---|---|
| Input power 24 dBm | Resonant frequency | 2 GHz |
| Normalized efficiency | FS normalization | –5 |
| Normalized SAR value | Back –5 mm | 0.95 |
| | Bottom –5 mm | 0.57 |

FIG. 9c

| Antenna system in this embodiment of this application (one suspended radiator section) | | |
|---|---|---|
| Input power 24 dBm | Resonant frequency | 1.95 GHz |
| Normalized efficiency | FS normalization | −5 |
| Normalized SAR value | Back −5 mm | 0.86 |
| | Bottom −5 mm | 0.53 |

FIG. 14a

| Antenna system in this embodiment of this application (two suspended radiator sections) | | |
|---|---|---|
| Input power 24 dBm | Resonant frequency = 2 GHz | ANT 1 |
| Normalized efficiency | FS normalization | −5 |
| Normalized SAR value | Back −5 mm | 0.89 |
| | Bottom −5 mm | 0.55 |

FIG. 14b

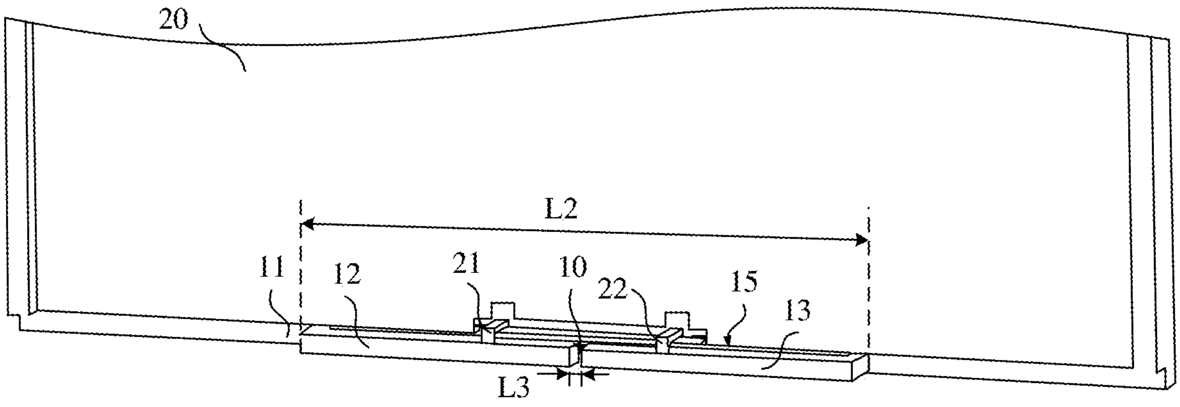

FIG. 15

| Single antenna formed by an antenna with an open slit in a reference design (case 1) | | |
|---|---|---|
| Input power 24 dBm | Resonant frequency = 1.85 GHz | ANT 1 |
| Normalized efficiency | FS normalization | −5 |
| Normalized SAR value | Back −5 mm | 0.95 |
| | Bottom −5 mm | 1.31 |

FIG. 19a

| This embodiment of this application | | |
|---|---|---|
| Input power 24 dBm | Resonant frequency = 1.9 GHz | ANT 1 |
| Normalized efficiency | FS normalization | −5 |
| Normalized SAR value | Back −5 mm | 0.82 |
| | Bottom −5 mm | 0.93 |

FIG. 19b

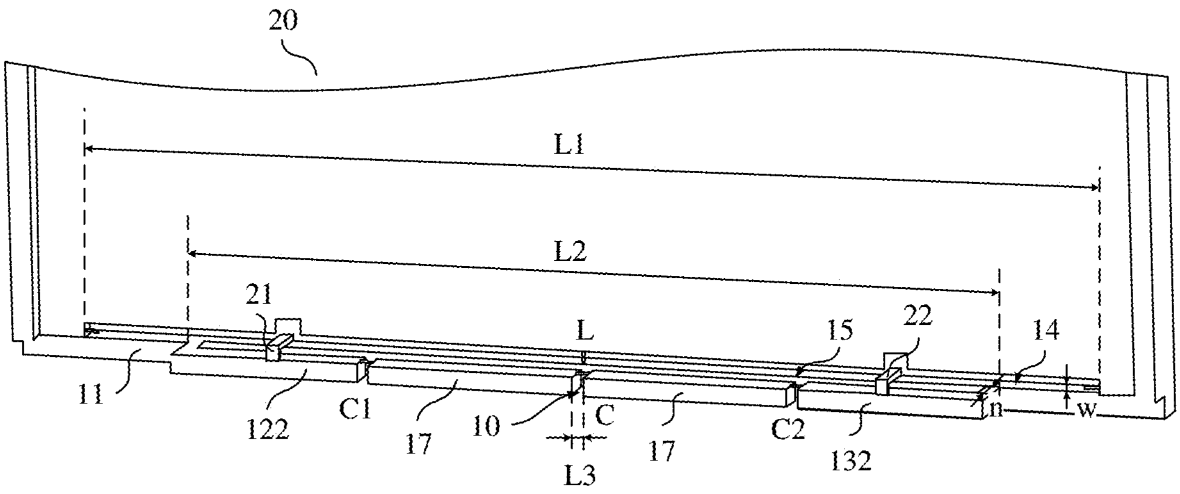

FIG. 20

| This embodiment of this application | | |
|---|---|---|
| Input power 24 dBm | Resonant frequency = 1.9 GHz | ANT 1 |
| Normalized efficiency | FS normalization | –5 |
| Normalized SAR value | Back –5 mm | 0.82 |
| | Bottom –5 mm | 0.93 |

| This embodiment of this application | | |
|---|---|---|
| Input power 24 dBm | Resonant frequency = 1.95 GHz | ANT 1 |
| Normalized efficiency | FS normalization | –5 |
| Normalized SAR value | Back –5 mm | 0.66 |
| | Bottom –5 mm | 0.57 |

ANTENNA SYSTEM AND ELECTRONIC DEVICE

CROSS-REFERENCE TO RELATED APPLICATIONS

This application is a National Stage of International Application No. PCT/CN2022/109988, filed on Aug. 3, 2022, which claims priority to Chinese Patent Application No. 202110919516.6, filed on Aug. 11, 2021, both of which are hereby incorporated by reference in their entireties.

TECHNICAL FIELD

This application relates to the field of antennas, and in particular, to an antenna system and an electronic device.

BACKGROUND

As 5G technologies gradually develop and are popularized, more antennas need to be integrated into a terminal device. When a plurality of antennas operate, if isolation between the antennas is poor, the antennas are coupled to each other. Consequently, a data throughput of the terminal device is limited, and user experience is affected. Even channel blockage or component damage is caused when a high-power transmit signal is coupled into another transceiver channel. Therefore, mutual coupling between the plurality of antennas becomes an urgent problem to be resolved in the industry.

In the conventional technology, the mutual coupling between the plurality of antennas may be decoupled through an orthogonal-mode decoupling technology or a mode-offsetting decoupling technology, to improve isolation between the antennas.

However, in the orthogonal-mode decoupling technology, decoupling can be implemented only when there are two or more orthogonal characteristic modes of antennas and different feeding designs are combined. In the mode cancellation decoupling technology, decoupling between antennas needs to be performed at a cost of half of an antenna diameter. Consequently, efficiency of a single antenna is low, and miniaturization of the antenna diameter is difficult to implement when efficiency of each antenna is ensured.

It can be learned that in the conventional technology, for an antenna in a single characteristic mode, it is difficult to consider both high isolation of antennas and miniaturization of an antenna diameter.

SUMMARY

An objective of this application is to resolve a problem in the conventional technology that both high isolation of antennas and miniaturization of an antenna diameter are difficult to be considered for an antenna in a single characteristic mode. Therefore, this application provides an antenna system and an electronic device, so that high isolation is generated at two ends (a grounding end and a radio frequency end) of respective radio frequency sources of a first antenna and a second antenna, to implement high isolation between the first antenna and the second antenna (or may be understood as decoupling between the first antenna and the second antenna).

An embodiment of this application provides an antenna system including a first antenna, a second antenna, and a ground. The first antenna includes a first radiator and a second radiator, and the second antenna includes the first radiator and a third radiator.

Two ends of the first radiator are electrically connected to the ground separately.

A first end of the second radiator is relatively far away from a first end of the third radiator, the first end of the second radiator and the first end of the third radiator are separately connected to or coupled to the first radiator, and a second end of the second radiator is disposed opposite to a second end of the third radiator, to form a gap.

The second radiator includes a first feeding connection point, and the antenna system feeds the first antenna through the first feeding connection point. The third radiator includes a second feeding connection point, and the antenna system feeds the second antenna through the second feeding connection point.

The first radiator and the ground are enclosed to form a closed slit. The first radiator, the second radiator, the third radiator, and the gap are enclosed to form a non-closed slit. The first feeding connection point of the second radiator is connected to a feeding end of a first radio frequency source of the electronic device, to receive a radio frequency signal output by the first radio frequency source, so that the first antenna radiates outward, and a grounding end of the first radio frequency source is connected to the ground. The second feeding connection point of the third radiator is connected to a feeding end of a second radio frequency source, to receive a radio frequency signal output by the second radio frequency source, so that the second antenna radiates outward, and a grounding end of the second radio frequency source is connected to the ground.

In this embodiment of this application, a new antenna system is constructed by the second radiator and the third radiator that are separately connected to the first radiator, the first radio frequency source connected between the second radiator and the ground, and the second radio frequency source connected between the third radiator and the ground. The antenna system with the structure can implement the following. When the first radio frequency source performs excitation, a current generated at a location to which the feeding end of the first radio frequency source is connected on the first antenna and a current generated at a location to which the grounding end of the first radio frequency source is connected on the ground are in a co-current mode. In addition, a current generated at a location to which the feeding end of the second radio frequency source is connected on the second antenna and a current generated at a location to which the grounding end of the second radio frequency source is connected on the ground are in a reverse current mode. Similarly, when the second radio frequency source performs excitation, a current generated at a location to which the feeding end of the first radio frequency source is connected on the first antenna and a current generated at a location to which the grounding end of the first radio frequency source is connected on the ground are in a reverse current mode. In addition, a current generated at a location to which the feeding end of the second radio frequency source is connected on the second antenna and a current generated at a location to which the grounding end of the second radio frequency source is connected on the ground are in a co-current mode.

Because the co-current mode and the reverse current mode form mode orthogonality, that is, when the first radio frequency source performs excitation, a current mode generated at locations to which two ends (the grounding end and the feeding end) of the first radio frequency source are connected on the first antenna and a current mode generated at locations to which two ends (the grounding end and the feeding end) of the second radio frequency source are connected on the second antenna form mode orthogonality. Similarly, when the second radio frequency source performs excitation, a current mode generated at locations to which two ends (the grounding end and the feeding end) of the first radio frequency source are connected on the first antenna and a current mode generated at locations to which two ends (the grounding end and the feeding end) of the second radio frequency source are connected on the second antenna also form mode orthogonality. Therefore, in this embodiment of this application, the following can be implemented by using the structure. When the first antenna and the second antenna simultaneously perform excitation, high isolation is generated at the two ends (the grounding end and the feeding end) of the respective radio frequency sources of the first antenna and the second antenna, so that high isolation is generated between the first antenna and the second antenna. To be specific, the first antenna and the second antenna are decoupled.

Further, in this embodiment of this application, because the first antenna and the second antenna share the first radiator, two antennas can be constructed under a condition of a conventional antenna with a closed slit and a same diameter. Therefore, bandwidth efficiency of the antennas is increased by at least one time. In other words, under a condition of same bandwidth efficiency, compared with an antenna diameter of a conventional antenna with a closed slit, an antenna diameter of the antenna system in this embodiment of this application may be reduced by at least half. Therefore, compared with the conventional antenna with the closed slit, the antenna system in this embodiment can implement miniaturization of an antenna diameter.

In some possible embodiments, in a width direction of the closed slit, the non-closed slit is located on a side that is of the first radiator and that is close to the closed slit.

In some possible embodiments, in a width direction of the closed slit, the non-closed slit is located on a side that is of the first radiator and that is away from the closed slit.

In some possible embodiments, in a thickness direction of the closed slit, the non-closed slit partially overlaps the first radiator, and is located on a side that is of the first radiator and that is away from the ground.

In some embodiments, the antenna system further includes an tuning component. One end of the tuning component is connected to the first radiator, and another end of the tuning component is connected to the ground. The tuning component is a capacitor and/or an inductor.

In this embodiment, a direction of a current on the closed slit can be adjusted by using the capacitor or the inductor disposed between the first radiator and the ground. Specifically, the direction of the current on the closed slit can be adjusted by selecting a capacitor or an inductor that matches an antenna diameter. Further, when the first radio frequency source performs excitation or the second radio frequency source performs excitation, a current mode generated at locations to which two ends (the feeding end and the grounding end) of the first radio frequency source are connected on the first antenna and a current mode generated at locations to which two ends (the feeding end and the grounding end) of the second radio frequency source are connected on the second antenna form mode orthogonality. To be specific, there is high isolation between the first antenna and the second antenna. In addition, an antenna diameter (or may be understood as a length of the closed slit) has a wide selection range, to provide a basis for application of the antenna system in this embodiment in different application scenarios.

In some embodiments, the first radiator, the second radiator, the third radiator, and the gap form the non-closed slit. In a length direction of the non-closed slit, a connection point formed by connecting the tuning component to the first radiator is located between the first feeding connection point and the second feeding connection point.

In some possible embodiments, a grounding point formed by connecting the tuning component to the ground is located between a first feeding grounding point formed by connecting the grounding end of the first radio frequency source to the ground and a second feeding grounding point formed by connecting the grounding end of the second radio frequency source to the ground.

In some possible embodiments, the grounding point formed by connecting the tuning component to the ground is located in a ground area that is on the ground and that is opposite to the gap, and the connection point formed by connecting the tuning component to the first radiator is located in a radiator section that is on the first radiator and that is opposite to the gap.

In some embodiments, the capacitor is disposed at the gap, and two ends of the capacitor are respectively connected to the second end of the second radiator and the second end of the third radiator.

In some embodiments, both the second radiator and the third radiator are in an L shape.

In some embodiments, the second radiator is configured with one or more first slots, and/or the third radiator is configured with one or more second slots.

In some possible embodiments, one of the second radiator and the third radiator is in an L shape, and the other radiator includes an L-shaped radiator section and at least one suspended radiator section. An end that is of the L-shaped radiator section and that is away from the at least one suspended radiator section is a first end of the other radiator, and an end that is of the at least one suspended radiator section and that is away from the L-shaped radiator section is a second end of the other radiator.

The other radiator receives a radio frequency signal through the L-shaped radiator section or any one of the at least one suspended radiator section.

Alternatively, both the second radiator and the third radiator include an L-shaped radiator section and at least one suspended radiator section. In the second radiator, an end that is of the L-shaped radiator section and that is away from the at least one suspended radiator section is a first end of the second radiator, and an end that is of the at least one suspended radiator section and that is away from the L-shaped radiator section is a second end of the second radiator. The first feeding connection point is disposed on the L-shaped radiator in the second radiator or any one of the at least one suspended radiator section.

In the third radiator, an end that is of the L-shaped radiator section and that is away from the at least one suspended radiator section is a first end of the third radiator, and an end that is of the at least one suspended radiator section and that is away from the L-shaped radiator section is a second end of the third radiator. The second feeding connection point is disposed on the L-shaped radiator in the third radiator or any one of the at least one suspended radiator section.

In some embodiments, a capacitor is disposed at at least one of the first slots and the second slots.

In some possible embodiments, a capacitor is disposed at each first slot and each second slot.

In some possible embodiments, the L-shaped radiator section is connected, via a capacitor, to an end that is of the at least one suspended radiator section and that is close to the L-shaped radiator section.

When the at least one suspended radiator section is a plurality of suspended radiator sections, each suspended radiator section is connected to an adjacent suspended radiator section via a capacitor.

In this embodiment of this application, the L-shaped radiator section and the at least one suspended radiator section are used, and the second radiator and/or the third radiator are/is formed after the radiator sections are connected via a capacitor. This structure can further help miniaturize an antenna diameter, and reduce an SAR value (Specific Absorption Ratio, specific absorption ratio) of the antenna system.

In some embodiments, a length of the closed slit is greater than or equal to ½ times a wavelength of the first antenna or the second antenna and is less than one time a wavelength of the first antenna or the second antenna.

In some possible embodiments, the first feeding grounding point formed by connecting the grounding end of the first radio frequency source to the ground and the first feeding connection point formed by connecting the feeding end of the first radio frequency source to the second radiator are both located on one side of the gap, and the second feeding grounding point formed by connecting the grounding end of the second radio frequency source to the ground and the second feeding connection point formed by connecting the feeding end of the second radio frequency source to the third radiator are both located on the other side of the gap. In addition, both the first feeding grounding point formed by connecting the grounding end of the first radio frequency source to the ground and the second feeding grounding point formed by connecting the grounding end of the second radio frequency source to the ground are located in the closed slit.

In some possible embodiments, the first feeding grounding point formed by connecting the grounding end of the first radio frequency source to the ground and the first feeding connection point formed by connecting the feeding end of the first radio frequency source to the second radiator are aligned in the width direction of the closed slit. The second feeding grounding point formed by connecting the grounding end of the second radio frequency source to the ground and the second feeding connection point formed by connecting the feeding end of the second radio frequency source to the third radiator are aligned in the width direction of the closed slit.

In some embodiments, the first radio frequency source and the second radio frequency source are different radio frequency sources or a same radio frequency source.

An embodiment of this application provides an electronic device, including the antenna system provided in any one of the foregoing embodiments or any possible embodiment.

In some embodiments, the first radiator is formed by a metal frame of the electronic device or an embedded metal structure part embedded in the metal frame. The second radiator and the third radiator are both formed by the metal structure part of the electronic device, or are both formed on a support of the electronic device through a laser direct structuring process.

In some embodiments, the first radiator is formed by a metal frame of the electronic device, and both the second radiator and the third radiator are formed by an embedded metal structure part embedded in the metal frame in the electronic device.

In some embodiments, the first radiator is formed by a metal battery cover of the electronic device or a metal middle frame of the electronic device; and the second radiator and the third radiator are both formed by a metal frame of the electronic device, or are both formed by an embedded metal structural part embedded in the metal frame, or are both formed on a support of the electronic device through a laser direct structuring process.

BRIEF DESCRIPTION OF THE DRAWINGS

FIG. 9*a*, FIG. 9*b*, and FIG. 9*c* are SAR value data tables obtained by separately performing a simulation effect test on an electronic device using a single antenna with a closed slit in a reference design and an electronic device using an antenna system with closed slits of different lengths according to an embodiment of this application;

FIG. 14*a* and FIG. 14*b* are respectively SAR value data tables obtained by performing a simulation effect test on an electronic device using an antenna system with one suspended radiator section and an electronic device using an antenna system with two suspended radiator sections according to an embodiment of this application;

FIG. 15 is a diagram of a three-dimensional structure of a dual antenna with an open slit in a reference design;

FIG. 19*a* and FIG. 19*b* are respectively SAR value data tables obtained by performing a simulation effect test on an electronic device using a single antenna with an open slit (namely, a case 1) in a reference design and an electronic device using an antenna system according to an embodiment of this application;

FIG. 20 is a diagram of a three-dimensional structure of an antenna system according to an embodiment of this application, where there are two suspended radiation sections;

DESCRIPTION OF REFERENCE NUMERALS

Figure 1:
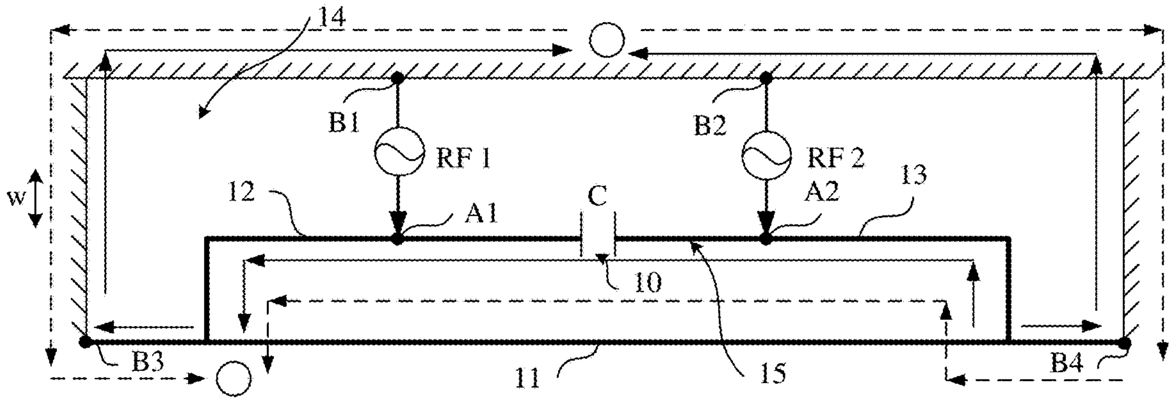
FIG. 1 is a schematic diagram of a principle structure of an antenna system according to an embodiment of this application.

1: antenna system;

10: gap;

11: first radiator; 111 and 112: radiating stub; 12: second radiator; 121: connector; 122: L-shaped radiator section; 13: third radiator; 131: connector; 132: L-shaped radiator section; 14: closed slit; 15: non-closed slit; 16: tuning component; 17: suspended radiator section; 18: slot;

20: PCB board; 21: radio frequency source connector; 22: radio frequency source connector; 23: duplexer;

RF: radio frequency source; RF 1: first radio frequency source; RF 2: second radio frequency source; C: capacitor; C1: capacitor; C2: capacitor; L, $L_A$, $L_B$, $L_C$, and $L_D$: inductor;

A1: first feeding connection point; A2: second feeding connection point; A3: connection point; B1: first feeding grounding point; B2: second feeding grounding point; B3: grounding point; B4: grounding point; B5: grounding point;

SW 1: switch circuit; SW 2: switch circuit;

K1: switch; K2: switch;

L1: length of a closed slit; L2: length of a non-closed slit; L3: length of a gap; L4, L5, L6, and L7: length;

w: width of a closed slit; n: width of a non-closed slit; and x: width.

DETAILED DESCRIPTION OF ILLUSTRATIVE EMBODIMENTS

The following describes implementations of this application by using specific embodiments. A person skilled in the art may easily understand other advantages and effects of this application from content disclosed in this specification. Although descriptions of this application are described with reference to some embodiments, it does not mean that features of this application are limited to the implementations. On the contrary, a purpose of introducing the application with reference to the implementations is to cover other options or modifications that may be extended based on the claims of this application. To provide a deep understanding of this application, the following descriptions include many specific details. This application may also be implemented without using these details. In addition, to avoid confusion or obscureness of a focus of this application, some specific details are omitted in the descriptions. It should be noted that, in a case of no conflict, embodiments in this application and features in the embodiments may be mutually combined.

It should be noted that in this specification, similar reference numerals and letters indicate similar items in the following accompanying drawings. Therefore, once an item is defined in one accompanying drawing, the item does not need to be further defined and explained in subsequent accompanying drawings.

In the description of this application, it should be noted that orientation or location relationships indicated by terms such as “center”, “up”, “down”, “left”, “right”, “vertical”, “horizontal”, “inside”, and “outside” are orientation or location relationships shown in the accompanying drawings, and are merely for ease of description and simplification of this application, instead of indicating or implying that a specified apparatus or element needs to have a specific orientation, and is constructed and operated in a specific orientation, and therefore the orientation or location relationships cannot be construed as a limitation on this application. It should be noted that terms “first”, “second”, and the like are used only for description, and cannot be understood as indicating or implying relative importance.

In the description of this application, it should be noted that, unless otherwise specified and limited, terms “installation”, “connection”, and “connected” should be understood in a broad sense. For example, “connection” may be a fixed connection, a detachable connection, or an integrated connection; may be a mechanical connection, or an electrical connection; and may be a direct connection, an indirect connection via an intermediate medium, or communication between two elements. For a person of ordinary skill in the art, a specific meaning of the foregoing terms in this application may be understood according to a specific situation.

In the description of this application, it should be understood that, in this application, “electrical connection” may be understood as a form in which components are physically in contact and electrically conductive, or may be understood as a form in which different components in a line structure are connected through physical lines that can transmit an electrical signal, such as a printed circuit board (printed circuit board, PCB) copper foil or a conducting wire. “Coupled through . . . ” can be understood as that electricity is remotely conducted in an indirect coupling manner. Indirect coupling may be understood as contactless coupling. A person skilled in the art may understand that a coupling phenomenon is a phenomenon that an input and output of two or more circuit elements or electrical networks closely cooperate with each other and affect each other, and energy is transmitted from one side to the other side through interaction. To make the objectives, technical solutions, and advantages of this application clearer, the following further describes the implementations of this application in detail with reference to the accompanying drawings.

Refer to FIG. 1. FIG. 1 is a schematic diagram of a structure of an antenna system according to an embodiment of this application.

As shown in FIG. 1, an embodiment of this application provides the antenna system, including a first antenna and a second antenna. The first antenna includes a first radiator 11 and a second radiator 12, and the second antenna includes the first radiator 11 and a third radiator 13. That is, the first radiator 11 is a shared radiator of the first antenna and the second antenna.

Two ends of the first radiator 11 are separately connected to a ground, and a grounding point B3 and a grounding point B4 are formed on the ground. The two ends of the first radiator 11 may be directly connected to the ground, or may be indirectly connected to the ground through a connector, for example, a conductor or a conducting wire. In addition, the first radiator 11 and the ground are enclosed to form a closed slit 14 (namely, a closed slit 14 shown in FIG. 2*a*). The closed slit may be understood as a through slot that is closed around.

Figure 2A:
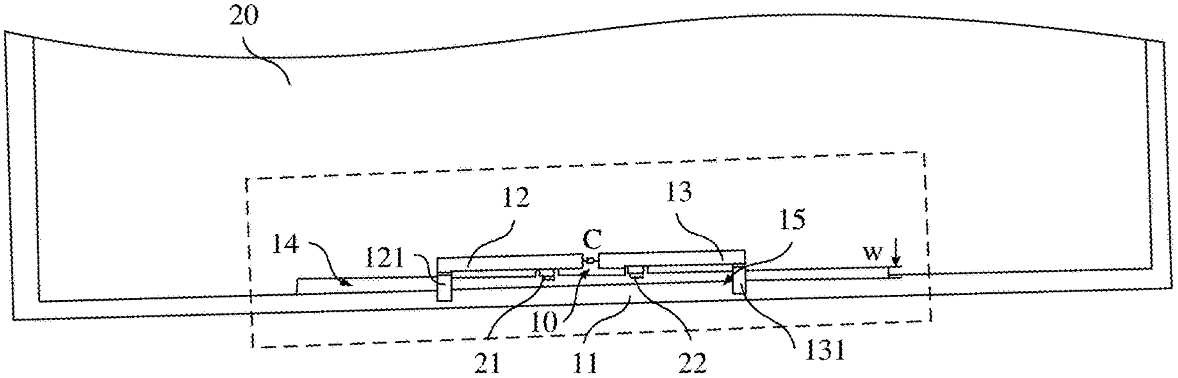
FIG. 2*a* is a schematic diagram of a three-dimensional structure of an antenna system in an electronic device according to an embodiment of this application, where both a second radiator and a third radiator are in an L shape, and in a width direction of a closed slit, a non-closed slit is located on a side that is of a first radiator and that is close to the closed slit.
Figure 2B:
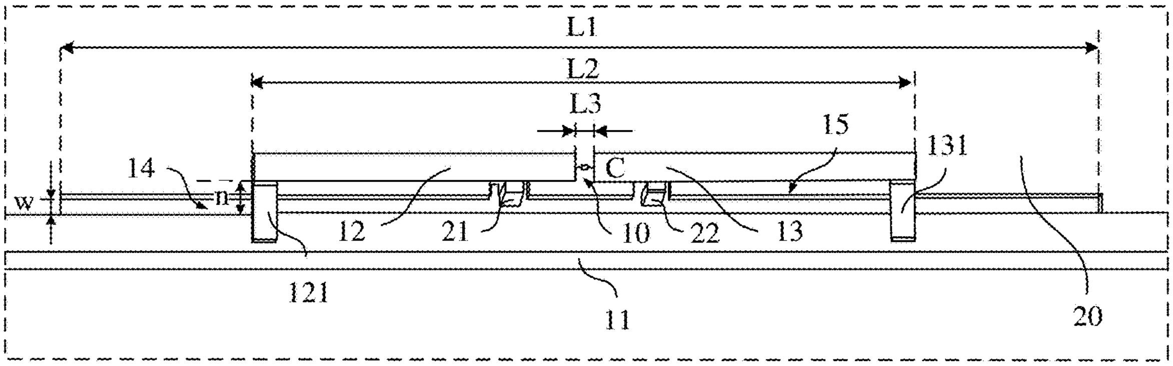
FIG. 2*b* is a schematic diagram of a zoomed-in region of the antenna system in FIG. 2*a;*

In an implementation, as shown in FIG. 1 and with reference to FIG. 2*a* and FIG. 2*b*, FIG. 2*a* is a schematic diagram of a three-dimensional structure of an antenna system in an electronic device according to an embodiment of this application, and FIG. 2*b* is a schematic diagram of a zoomed-in region of the antenna system in an electronic device according to an embodiment of this application; a first end of the second radiator 12 is relatively far away from a first end of the third radiator 13, and the first end of the second radiator 12 and the first end of the third radiator are separately connected to the first radiator 11; and a second end of the second radiator 12 and a second end of the third radiator 13 are disposed end-to-end and at an interval, to form a gap 10. The first radiator 11, the second radiator 12, the third radiator 13, and the gap 10 are enclosed to form a non-closed slit 15 (namely, a non-closed slit 15 shown in FIG. 2*a*). The non-closed slit may be understood as a through slot having an opening, where the opening is formed by the gap 10.

In another implementation, the first end of the second radiator 12 and the first end of the third radiator 13 may also be coupled to the first radiator, that is: The first end of the second radiator 12 is not directly connected to the first radiator 11, a slot is formed between the first end of the second radiator 12 and the first radiator 11, and radiation energy is coupled through the slot; and the first end of the third radiator 13 is also not directly connected to the first radiator 11, a slot is formed between the first end of the third radiator 13 and the first radiator 11, and radiation energy is coupled through the slot.

The slot may be formed in a width direction parallel to the closed slit, or may be formed in a thickness direction parallel to the closed slit.

It should be noted that an end or the first end and the second end are not limited to an end face of the radiator, and may also be a section of the radiator including the end face, for example, a radiator section within 1 mm and 2 mm away from the end face.

Further, the second radiator 12 may be coupled through a coupling stub located in the slot between the second radiator 12 and the first radiator 11. The coupling stub may be connected to the first radiator 11, or may not be connected to the first radiator 11. The third radiator 13 may be coupled through a coupling stub located in the slot between the third radiator 13 and the first radiator 11. The coupling stub may be connected to the first radiator 11, or may not be connected to the first radiator 11. Sizes of the slot and the coupling stub are not limited, and do not depart from the scope of this application provided that the sizes can meet an energy coupling requirement.

The second radiator 12 includes a first feeding connection point A1, and the antenna system 1 feeds the first antenna through the first feeding connection point A1. The third radiator 13 includes a second feeding connection point A2, and the antenna system 1 feeds the second antenna through the second feeding connection point A2.

Specifically, the first feeding connection point A1 of the second radiator 12 is connected to a feeding end of a first radio frequency source RF 1 of the electronic device, to receive a radio frequency signal output by the first radio frequency source RF 1, so that the first antenna radiates outward, and a grounding end of the first radio frequency source RF 1 is connected to the ground. The second feeding connection point A2 of the third radiator 13 is connected to a feeding end of a second radio frequency source RF 2 of the electronic device, to receive a radio frequency signal output by the second radio frequency source RF 2, so that the second antenna radiates outward, and a grounding end of the second radio frequency source RF 2 is connected to the ground. The second radiator 12 may be directly connected to the feeding end of the first radio frequency source RF 1 of the electronic device, or may be connected to the feeding end of the first radio frequency source RF 1 through a radio frequency source connector 21 (as shown in FIG. 2*a*), for example, a spring pin or a conducting wire. Similarly, the third radiator 13 may be directly connected to the feeding end of the second radio frequency source RF 2 of the electronic device, or may be connected to the feeding end of the second radio frequency source RF 2 through a radio frequency source connector 22 (as shown in FIG. 2*a*), for example, a spring pin or a conducting wire.

In this embodiment, the second radiator 12 may be connected to the first radio frequency source RF 1 through a coaxial cable, and specifically, may be connected to the feeding end of the first radio frequency source RF 1 through an inner core of the coaxial cable. The third radiator 13 may also be connected to the second radio frequency source RF 2 through a coaxial cable, and specifically, may be connected to the feeding end of the second radio frequency source RF 2 through an inner core of the coaxial cable. Certainly, a person skilled in the art may understand that the feeding end may also be another alternative solution, and does not limit the protection scope of this application herein.

It should be noted that, in this embodiment, the first radio frequency source RF 1 and the second radio frequency source RF 2 are different radio frequency sources.

Further, a capacitor C is disposed between the second radiator 12 and the third radiator 13. The capacitor C is configured to adjust a location of a reverse point (which may be understood with reference to a reverse point mentioned below) generated when a current flow passes through each radiator and the ground, so that a current mode generated at locations to which two ends (a grounding end and a feeding end) of the first radio frequency source are connected on the first antenna and a current mode generated at locations to which two ends (a grounding end and a feeding end) of the second radio frequency source are connected on the second antenna can form mode orthogonality. In this way, high isolation is formed between the first antenna and the second antenna. Certainly, a person skilled in the art may understand that no capacitor may be disposed between the second radiator 12 and the third radiator 13, provided that the foregoing current modes are orthogonal during design, and high isolation is formed between the first antenna and the second antenna.

The antenna system in embodiments may be applied to a plurality of electronic devices having a signal transmission function, for example, the antenna system may be applied to electronic devices such as a watch, a mobile phone, a wearable intelligent device, and a smart home device. A type of the antenna system is not limited. For example, the antenna system may be a 5G mobile communication antenna (MIMO), for example, a primary LTE transceiver antenna or a secondary LTE transceiver antenna, or may be a short-range communications antenna, for example, a V2X-1 transceiver antenna or a Wi-Fi/BLE antenna, or may be a radio antenna. In addition, in the antenna system in embodiments, the first antenna and the second antenna may operate in a same frequency band, for example, any frequency band within 6 GHz, or may operate in different frequency bands. For example, a difference between center frequencies of the first antenna and the second antenna in operating frequency bands may be 1 GHz. Specifically, the first antenna and the second antenna may respectively operate in a frequency sub-band whose frequency range is 724 MHz to 788 MHz, a frequency sub-band whose frequency range is 791 MHz to 860 MHz, a frequency sub-band whose frequency range is 824 MHz to 894 MHz, a frequency sub-band whose frequency range is 880 MHz to 960 MHz, and the like.

Further, refer to FIG. 2*a* and FIG. 2*b*. An example in which the electronic device is a mobile phone is used. The first radiator 11 in this implementation may be formed by a metal frame of the mobile phone, for example, an outer metal frame of the mobile phone, or may be formed by an embedded metal structure part embedded in the metal frame of the mobile phone. The second radiator 12 and the third radiator 13 may be formed by a metal structure part of the mobile phone, for example, a metal sheet, or may be formed on a support of the mobile phone through a laser direct structuring process, or may be attached on a structure part near an antenna through an FPC process, for example, on a support or a battery cover of the mobile phone. The second radiator 12 and the third radiator 13 may be directly connected to the first radiator 11, or may be indirectly connected to the first radiator 11 through a connector 121 and a connector 131 respectively. The connector 121 forms a part of the second radiator 12, and the connector 131 forms a part of the third radiator 13. The connector 121 and the connector 131 may be, for example, spring pins, welding rods, conductive foam, or metal structure parts. The ground may be at least a part of any grounding structure in the electronic device or at least a part of a combination. For example, the ground may be formed by a PCB board 20 in the mobile phone. In another example, the ground may be a conductive sheet, a middle frame bottom plate of the electronic device, a copper layer of a display, or the like.

Further, a processing process of each component in this embodiment is not limited. For example, the first radiator 11 may be welded on the PCB board 20, or may be directly formed on the PCB board 20 after a through slot that is closed around is processed on the PCB board to form a closed slit 14. Certainly, a person skilled in the art may understand that there may also be another alternative solution, and the protection scope of this application is not limited herein.

In a specific operating process, as shown in FIG. 1, a solid line arrow in FIG. 1 represents a current formed on each radiator and the ground when the first radio frequency source RF 1 performs excitation, a dashed line arrow in FIG. 1 represents a current formed on each radiator and the ground when the second radio frequency source RF 2 performs excitation, and a circle in the figure shows a reverse point of a current flowing through the radiator and the ground. When the first radio frequency source RF 1 performs excitation, a current generated at the first feeding connection point A1 (namely, a location to which the feeding end of the first radio frequency source is connected) of the first antenna is shown by a solid line arrow closest to the first feeding connection point A1 in FIG. 1, and a current generated at a first feeding grounding point B1 (namely, a location to which the grounding end of the first radio frequency source is connected on the ground) of the first antenna is shown by a solid line arrow closest to the first feeding grounding point B1 in FIG. 1. It can be learned that a current flows from the first feeding connection point A1 to the first feeding grounding point B1 through the ground, that is, a current mode of the first antenna at the first feeding connection point A1 and the first feeding grounding point B1 is a co-current mode. In addition, a current generated at the second feeding connection point A2 (namely, a location to which the feeding end of the second radio frequency source is connected) of the second antenna is shown by a solid line arrow closest to the second feeding connection point A2 in FIG. 1, and a current generated at a second feeding grounding point B2 (namely, a location to which the grounding end of the second radio frequency source is connected on the ground) of the second antenna is shown by a solid line arrow closest to the second feeding grounding point B2 in FIG. 1. It can be learned that a current flow direction at the second feeding connection point A2 is opposite to a current flow direction at the second feeding grounding point B2, that is, a current mode of the second antenna at the second feeding connection point A2 and the second feeding grounding point B2 is a reverse current mode.

When the second radio frequency source RF 2 performs excitation, a current generated at the first feeding connection point A1 (namely, a location to which the feeding end of the first radio frequency source is connected) of the first antenna is shown by a dashed line arrow closest to the first feeding connection point A1 in FIG. 1, and a current generated at the first feeding grounding point B1 (namely, a location to which the grounding end of the first radio frequency source is connected on the ground) of the first antenna is shown by a dashed line arrow closest to the first feeding grounding point B1 in FIG. 1. It can be learned that a current direction of the first feeding connection point A1 is opposite to a current direction of the first feeding grounding point B1, that is, a current mode of the first antenna at the first feeding connection point A1 and the first feeding grounding point B1 is a reverse current mode. In addition, a current generated at the second feeding connection point A2 (namely, a location to which the feeding end of the second radio frequency source is connected) of the second antenna is shown by a dashed line arrow closest to the second feeding connection point A2 in FIG. 1, and a current generated at the second feeding grounding point B2 (namely, a location to which the grounding end of the second radio frequency source is connected on the ground) of the second antenna is shown by a dashed line arrow closest to the second feeding grounding point B2 in FIG. 1. It can be learned that a current flows from the second feeding grounding point B2 to the second feeding connection point A2, that is, a current mode of the second antenna at the second feeding connection point A2 and the second feeding grounding point B2 is a co-current mode.

Therefore, regardless of whether the first radio frequency source RF 1 performs excitation or the second radio frequency source RF 2 performs excitation, the current mode of the first antenna for two ends (the first feeding connection point A1 and the first feeding grounding point B1) of the first radio frequency source RF 1 and the current mode of the second antenna for two ends (the second feeding connection point A2 and the second feeding grounding point B2) of the second radio frequency source RF 2 can always form mode orthogonality, to generate high isolation.

In this embodiment of this application, a new antenna system is constructed by the second radiator and the third radiator that are separately connected to the first radiator, the first radio frequency source connected between the second radiator and the ground, and the second radio frequency source connected between the third radiator and the ground. The antenna system with the structure can implement the following.

When the first radio frequency source performs excitation, a current generated at a location to which the feeding end of the first radio frequency source is connected (namely, the first feeding connection point A1) on the first antenna and a current generated at a location to which the grounding end of the first radio frequency source is connected (namely, the first feeding grounding point B1) on the ground are in a co-current mode. In addition, a current generated at a location to which the feeding end of the second radio frequency source is connected (namely, the second feeding connection point A2) on the second antenna and a current generated at a location to which the grounding end of the second radio frequency source is connected (namely, the second feeding grounding point B2) on the ground are in a reverse current mode.

Similarly, when the second radio frequency source performs excitation, a current generated at a location to which the feeding end of the first radio frequency source is connected (namely, the first feeding connection point A1) on the first antenna and a current generated at a location to which the grounding end of the first radio frequency source is connected (namely, the first feeding grounding point B1) on the ground are in a reverse current mode. In addition, a current generated at a location to which the feeding end of the second radio frequency source is connected (namely, the second feeding connection point A2) on the second antenna and a current generated at a location to which the grounding end of the second radio frequency source is connected (namely, the second feeding grounding point B2) on the ground are in a co-current mode.

Further, because the co-current mode and the reverse current mode form mode orthogonality, that is, when the first radio frequency source performs excitation, a current mode generated at locations to which two ends (the grounding end and the feeding end) of the first radio frequency source are connected on the first antenna and a current mode generated at locations to which two ends (the grounding end and the feeding end) of the second radio frequency source are connected on the second antenna form mode orthogonality. Similarly, when the second radio frequency source performs excitation, a current mode generated at locations to which two ends (the grounding end and the feeding end) of the first radio frequency source are connected on the first antenna and a current mode generated at locations to which two ends (the grounding end and the feeding end) of the second radio frequency source are connected on the second antenna also form mode orthogonality. Therefore, in this embodiment of this application, the following can be implemented by using the structure. When the first antenna and the second antenna simultaneously perform excitation, high isolation is generated at the two ends of the respective radio frequency sources of the first antenna and the second antenna, to form high isolation between the first antenna and the second antenna, so that the first antenna and the second antenna are decoupled.

The reverse point mentioned above may be understood as a point at which currents flowing on two sides are in opposite current directions. It can be learned from FIG. 1 that there is a reverse point on the first radiator 11, and there is a reverse point on the ground. The reverse point on the first radiator 11 and the reverse point on the ground are staggered in a length direction of the closed slit 14, so that a current mode generated at locations to which two ends (the grounding end and the feeding end) of the first radio frequency source are connected on the first antenna and a current mode generated at locations to which two ends (the grounding end and the feeding end) of the second radio frequency source are connected on the second antenna can form mode orthogonality. In this way, high isolation is formed between the first antenna and the second antenna.

Further, in this embodiment of this application, because the first antenna and the second antenna share the first radiator, two antennas can be constructed under a condition that a diameter is the same as that of a conventional single antenna with a closed slit. Therefore, bandwidth efficiency of the antennas is increased by at least one time. In other words, under a condition of same bandwidth efficiency, compared with an antenna diameter of a conventional single antenna with a closed slit, an antenna diameter of the antenna system in this embodiment of this application may be reduced by at least half. Therefore, compared with the conventional single antenna with the closed slit, the antenna system in this embodiment can implement miniaturization of an antenna diameter.

In addition, in this embodiment of this application, asymmetric feeding is used, for example, anti-symmetric feeding, and a complex feeding network does not need to be designed. This has advantages of a simple feeding structure and low sensitivity to a complex environment.

An embodiment of this application further provides an electronic device, including the antenna system 1 in any one of the foregoing implementations.

Further, in this implementation, both the first feeding connection point A1 and the first feeding grounding point B1 of the first radio frequency source RF 1 are located on one side of the gap 10, and both the second feeding connection point A2 and the second feeding grounding point B2 of the second radio frequency source RF 2 are located on the other side of the gap 10. In addition, both the first feeding grounding point B1 of the first radio frequency source RF 1 and the second feeding grounding point B2 of the second radio frequency source RF 2 are located in the closed slit 14, specifically, may be located between a grounding point B3 and a grounding point B4. In some solutions, the first feeding connection point A1 of the first radio frequency source RF 1 and the second feeding connection point A2 of the second radio frequency source RF 2 may be symmetrical about the gap 10. In some other solutions, the first feeding connection point A1 of the first radio frequency source RF 1 and the second feeding connection point A2 of the second radio frequency source RF 2 may also be asymmetric.

Further, refer to FIG. 1. In this embodiment, the first feeding connection point A1 and the first feeding grounding point B1 of the first radio frequency source RF 1, and the second feeding connection point A2 and the second feeding grounding point B2 of the second radio frequency source RF 2 are aligned in a width w direction of the closed slit. A person skilled in the art may understand that the alignment also includes a solution in which alignment is complete and a solution in which alignment is approximate. Certainly, in another alternative implementation, a solution of non-alignment may also be used.

Further, in this implementation, as shown in FIG. 1 and with reference to FIG. 2*a* and FIG. 2*b*, it is understood that both the second radiator 12 and the third radiator 13 are in an L shape, and in the width w direction of the closed slit, the non-closed slit 15 is located on a side that is of the first radiator 11 and that is close to the closed slit 14, or it is understood that: The second radiator 12 and the third radiator 13 are disposed in parallel to the PCB board 20, and the gap formed by the second radiator 12 and the third radiator 13 is located on a side that is of the first radiator 11 and that is close to the PCB board 20. A person skilled in the art may understand that the L shape also includes a solution in which a shape is similar to the L shape.

Further, a length L1 of the closed slit is greater than a length L2 of the non-closed slit, for example, a length of the closed slit may be 1 to 2.5 times a length of the non-closed slit, or may be 1.3 to 2 times a length of the non-closed slit.

Further, the length L1 of the closed slit is greater than or equal to ½ times a wavelength of the first antenna or the second antenna and is less than one time the wavelength of the first antenna or the second antenna. As shown in FIG. 2*b*, in this implementation, the length L1 of the closed slit is 40 mm. Certainly, a person skilled in the art may understand that the length L1 of the closed slit may also be other sizes meeting different IDs (namely, serial numbers of electronic devices) or different architectures.

Figure 3:
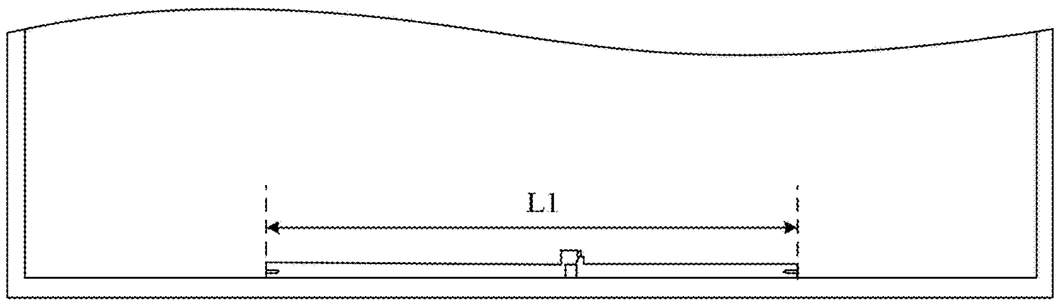
FIG. 3 is a schematic diagram of a structure of a single antenna with a closed slit in a reference design.

It can be learned that the antenna system in this implementation can implement two antennas by using an antenna diameter of ½ times a wavelength (namely, the length of the closed slit is equal to ½ times the wavelength of the first antenna or the second antenna) of the antenna. However, a single antenna with a closed slit, like a single antenna with a closed slit shown in FIG. 3 is compared, FIG. 3 is a schematic diagram of a structure of the single antenna with the closed slit in a reference design, and the single antenna implements only one antenna by using an antenna diameter of ½ times the wavelength of the antenna. In the antenna system of this implementation, bandwidth may be increased by at least one time under a condition that the antenna diameter is the same as that of the single antenna, and the antenna diameter may be reduced by half under a condition that the antenna bandwidth is the same as that of the single antenna.

Figure 4A:
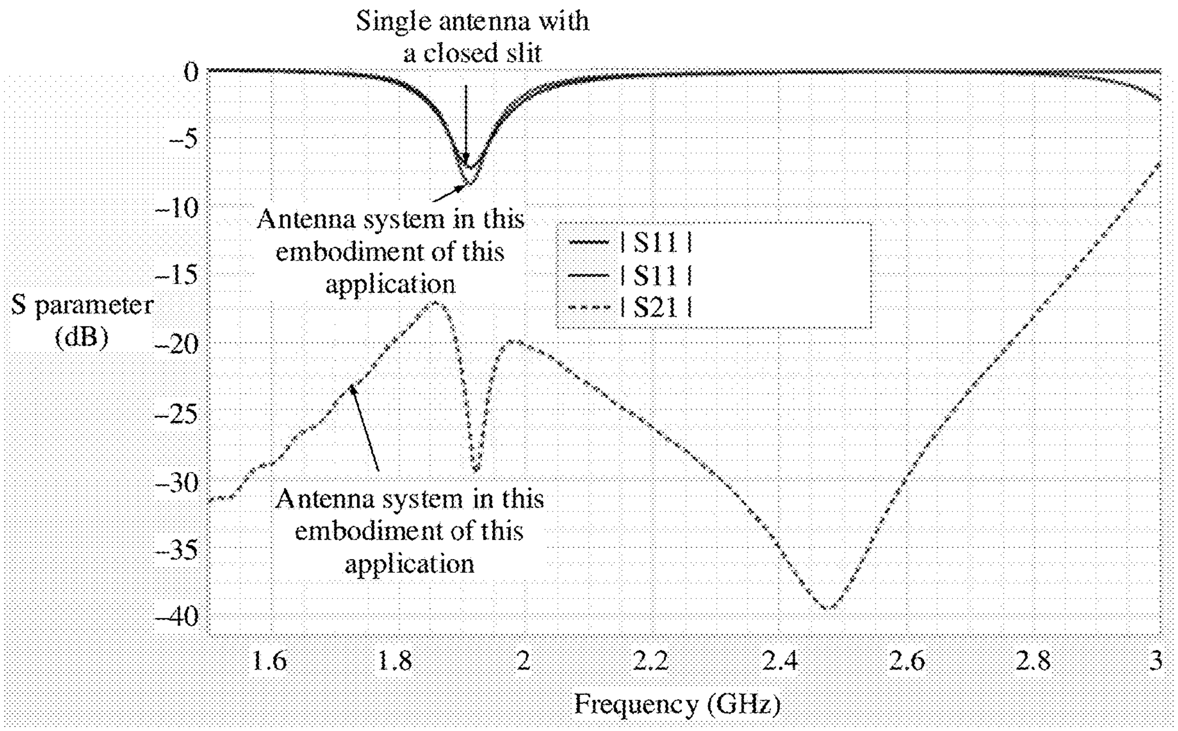
FIG. 4*a* and FIG. 4*b* are respectively curve comparison diagrams of S parameter effects and antenna efficiency that are obtained by performing a simulation effect test on a single antenna with a closed slit in a reference design and an antenna system according to an embodiment of this application.
Figure 4B:
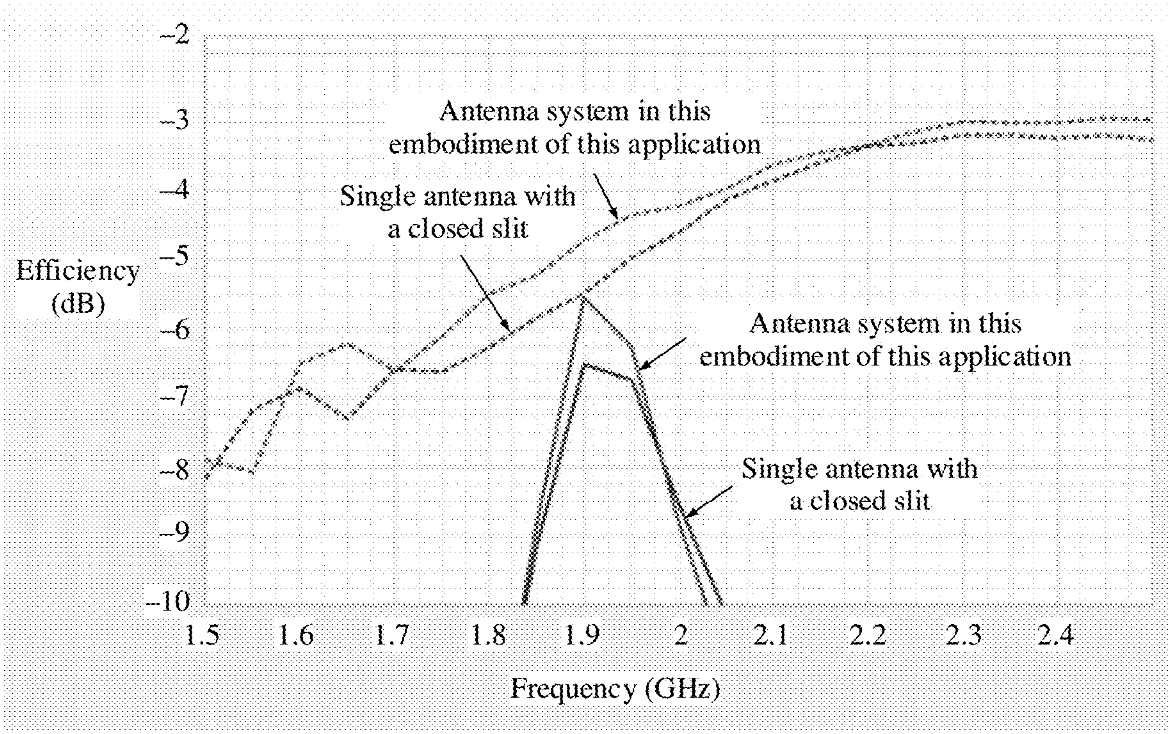

Simulation software is used to perform simulation analysis on the single antenna with the closed slit in a reference design and the antenna system provided in this embodiment, and curve diagrams of effects shown in FIG. 4*a* and FIG. 4*b* are obtained.

Simulation effects of the obtained curve diagrams shown in FIG. 4*a* and FIG. 4*b* are shown in the following Table 1 (which is understood with reference to FIG. 2*b* and FIG. 3):

TABLE 1

| Parameters | This embodiment | Single antenna with a closed slit |
|---|---|---|
| Length L1 of a closed slit (mm) | 40 | 40 |
| Width w of the closed slit (mm) | 1 | 1 |
| Length L2 of a non-closed slit (mm) | 24 | / |
| Width n of the non-closed slit (mm) | 1 | / |
| Length L3 of a gap 10 (mm) | 1 | / |
| Resonant frequency (GHz) | 1.9 | 1.9 |
| Capacitor C (pF) | 0.2 | / |

As shown in FIG. 4*a* and FIG. 4*b*, FIG. 4*a* is a curve comparison diagram of S parameter effects obtained by performing a simulation effect test on a single antenna with a closed slit in a reference design and an antenna system according to an embodiment of this application, and FIG. 4*b* is a curve comparison diagram of antenna efficiency obtained by performing a simulation effect test on a single antenna with a closed slit in a reference design and an antenna system according to an embodiment of this application.

In FIG. 4*a*, a horizontal coordinate indicates a frequency in a unit of GHz, a vertical coordinate indicates an S parameter, a dashed line indicates an amplitude value of S21 in a unit of dB. S21 is one S parameter, and can indicate antenna isolation. A smaller parameter value of S21 indicates greater isolation between antennas and a smaller degree of mutual coupling between antennas. The isolation is indicated by an absolute value of S21. A solid line indicates an amplitude of S11 in a unit of dB. S11 is one S parameter. S11 indicates a reflection coefficient, and this parameter can indicate quality of antenna transmission efficiency. Specifically, a smaller value of S11 indicates a smaller return loss of an antenna and less energy reflected by the antenna, in other words, indicates more energy actually entering the antenna.

It can be learned from FIG. 4*a* that, in a range of an operating frequency band of 1.5 GHz to 2.8 GHz, a value of S11 of the single antenna with the closed slit is about −7 dB to 0 dB, and a value of S11 of the antenna system in this implementation is about −9 dB to −0 dB. It can be learned that the S11 parameter of each antenna of the antenna system in this implementation is better than the S11 parameter of the single antenna with the closed slit. It can be further learned from FIG. 4*a* that, in a range of an operating frequency band of 1.5 GHz to 2.8 GHz, the S21 parameter of the antenna system in this implementation is about less than −17 dB, that is, isolation between the first antenna and the second antenna in the antenna system can almost reach more than 17 dB, and in frequency bands of 1.9 GHz to 1.95 GHz and 2 GHz to 2.75 GHz, the S21 parameter is about less than −20 dB, that is, isolation can reach more than 20 dB. Therefore, the antenna system in this implementation has high isolation.

In FIG. 4*b*, a horizontal coordinate indicates a frequency in a unit of GHz, a vertical coordinate indicates radiation efficiency and system efficiency of an antenna, a dashed line indicates the radiation efficiency, and a solid line indicates the system efficiency. The radiation efficiency is a value for measuring a radiation capability of the antenna, and both a metal loss and a dielectric loss are factors affecting the radiation efficiency. The system efficiency is actual efficiency obtained after antenna port matching is considered, that is, the system efficiency of the antenna is actual efficiency (namely, efficiency) of the antenna. A person skilled in the art may understand that the efficiency is generally indicated by a percentage, and there is a corresponding conversion relationship between the percentage and dB. Efficiency closer to 0 dB indicates better efficiency of the antenna.

It can be learned from FIG. 4*b* that, in a range of an operating frequency band of 1.83 GHz to 1.98 GHz, system efficiency of the first antenna in the antenna system is about −10 dB to −5.5 dB, and radiation efficiency is about −6 dB to −4.9 dB; and system efficiency of the single antenna with the closed slit is about −10 dB to −6.5 dB, and radiation efficiency is about −5.3 dB to −4.2 dB. It should be noted that, because an efficiency curve of the second antenna is similar to an efficiency curve of the first antenna, FIG. 4*b* shows only an antenna efficiency curve of the first antenna. It can be learned that, both the system efficiency and the radiation efficiency of the first antenna and the second antenna in the antenna system in this implementation are better than those of the single antenna with the closed slit.

Figure 5:
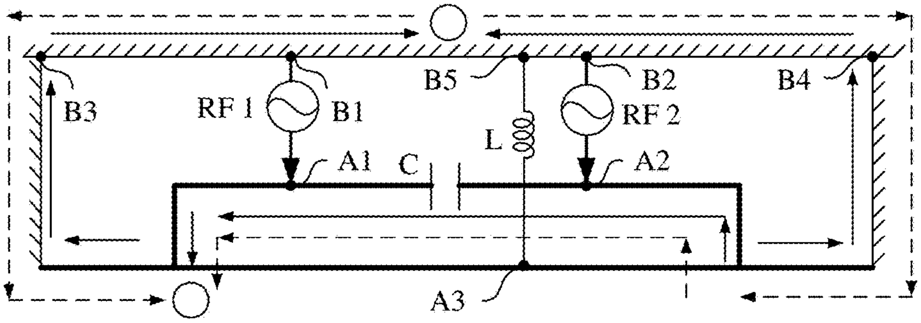
FIG. 5 is a schematic diagram of a principle structure of an antenna system according to an embodiment of this application, where an tuning component is disposed between a first radiator and a ground, and a capacitor is disposed between a second radiator and a third radiator.
Figure 6A:
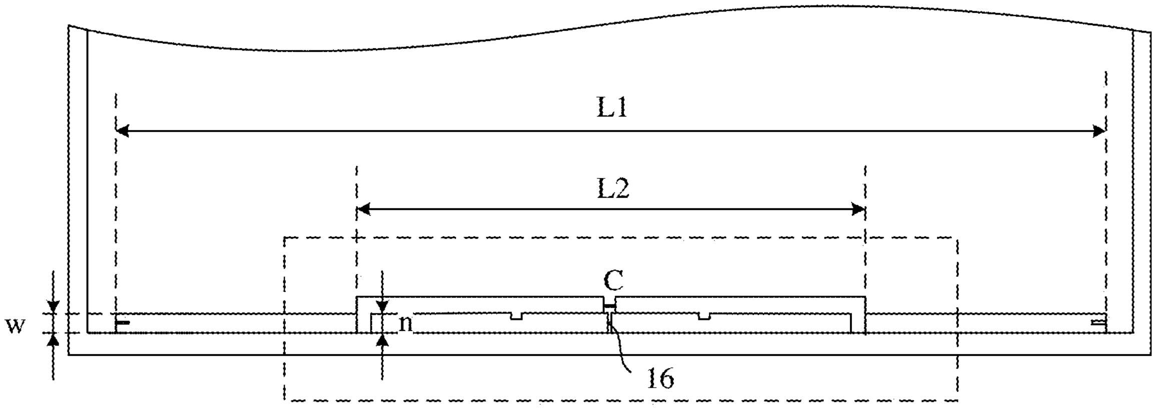
FIG. 6*a* is a schematic diagram of a three-dimensional structure of an antenna system in an electronic device according to an embodiment of this application.
Figure 6B:
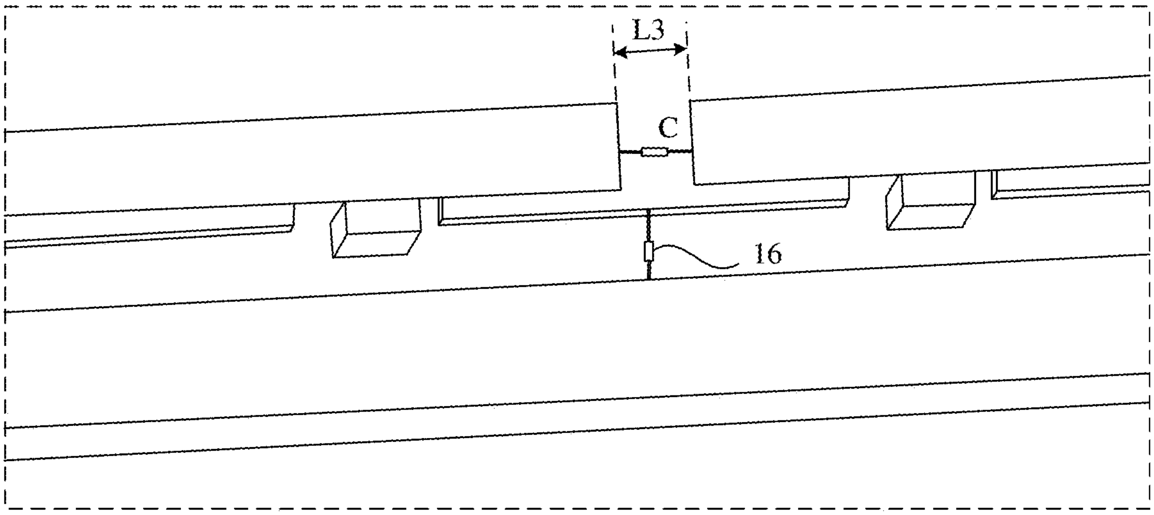
FIG. 6*b* is a schematic diagram of a structure of a zoomed-in region of the antenna system in FIG. 6*a;*

Refer to FIG. 5 to FIG. 6*b*. FIG. 5 is a schematic diagram of a principle structure of an antenna system according to an embodiment of this application. FIG. 6*a* is a schematic diagram of a three-dimensional structure of an antenna system in an electronic device according to an embodiment of this application. FIG. 6*b* is a schematic diagram of a structure of a zoomed-in region of the antenna system in FIG. 6*a*.

As shown in FIG. 5, a structure of the antenna system in this embodiment is basically the same as the structure of the antenna system shown in FIG. 1, and a difference lies in that an tuning component 16 is disposed between the first radiator and the ground. The tuning component 16 may be a capacitor, or may be an inductor L. As long as the tuning component 16 is a component that can adjust a location of a reverse point generated when a current flow passes through each radiator and the ground, the tuning component 16 does not depart from the scope of this application. In this implementation, the tuning component 16 is the inductor L. It should be understood that the solutions in FIG. 5 and FIG. 1 may be combined.

The tuning component 16 is configured to adjust the location of the reverse point generated when a current flow passes through each radiator and the ground, so that a current mode generated at locations to which two ends (the grounding end and the feeding end) of the first radio frequency source are connected on the first antenna and a current mode generated at locations to which two ends (the grounding end and the feeding end) of the second radio frequency source are connected on the second antenna can form mode orthogonality. In this way, high isolation is formed between the first antenna and the second antenna.

Further, a connection point A3 formed by connecting the tuning component 16 to the first radiator 11 is located between the first feeding connection point A1 and the second feeding connection point A2.

Further, a grounding point B5 formed by connecting the tuning component 16 to the ground is located between the first feeding grounding point B1 of the first radio frequency source RF 1 and the second feeding grounding point B2 of the second radio frequency source RF 2.

Further, the grounding point B5 formed by connecting the tuning component 16 to the ground is located in a ground area that is on the ground and that is opposite to the gap 10, and the connection point A3 formed by connecting the tuning component 16 to the first radiator 11 is located in a radiator section that is on the first radiator 11 and that is opposite to the gap 10.

It should be noted that: In some implementations, a capacitor C may not be disposed between the second radiator 12 and the third radiator 13, and only the tuning component 16 between the first radiator 11 and the ground is used, for example, an inductor for adjusting a location of the reverse point, and in some other implementations, the tuning component 16 may not be disposed, and only the capacitor C between the second radiator 12 and the third radiator 13 is used to adjust the location of the reverse point, or neither the capacitor C nor the tuning component 16 is disposed.

In addition, in this implementation, a length L1 of the closed slit is 72 mm (as shown in FIG. 6*a*), and is about ⅞ of a wavelength of the first antenna or the second antenna.

Figure 7:
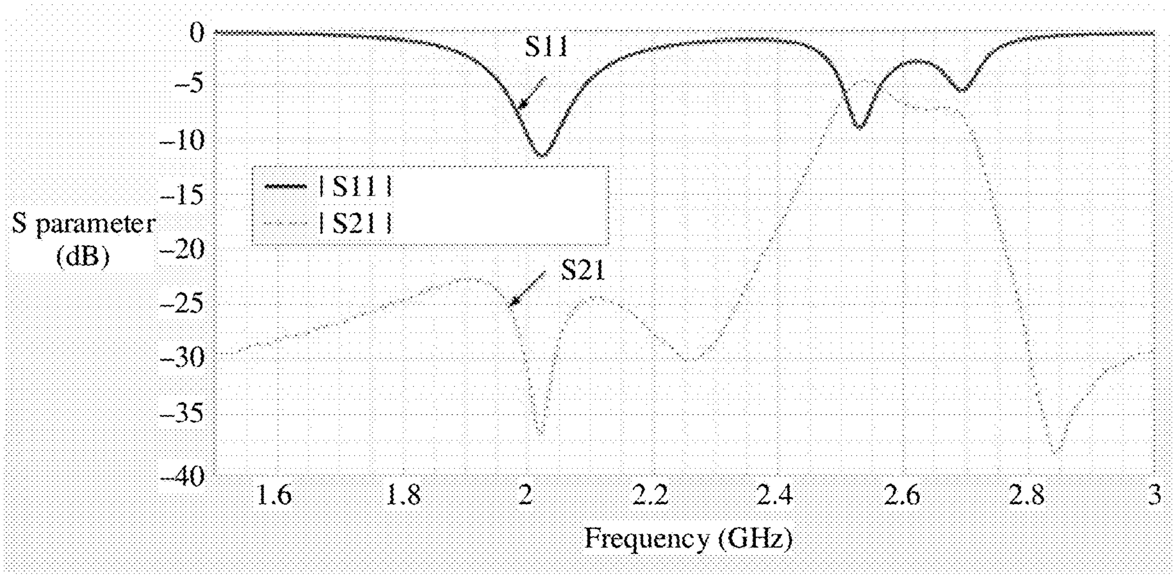
FIG. 7 is a curve diagram of an S parameter effect obtained by performing a simulation effect test on an antenna system according to an embodiment of this application.
Figure 8:
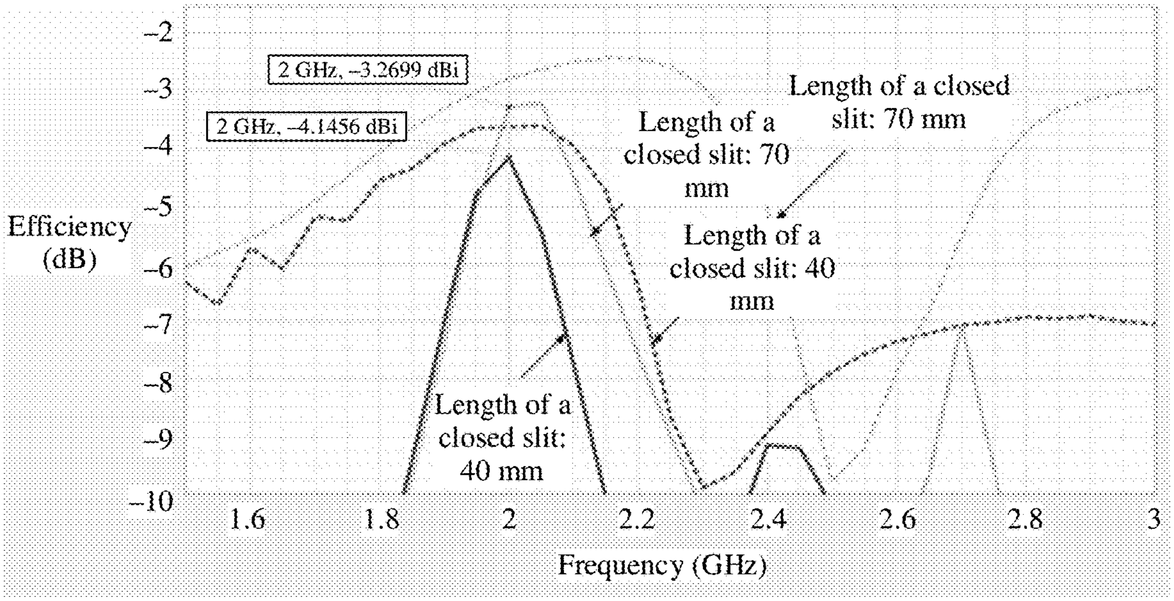
FIG. 8 is a curve comparison diagram of antenna efficiency obtained by performing a simulation effect test on an antenna system with closed slits of different lengths according to an embodiment of this application.

Simulation software is used to perform simulation analysis on the antenna system provided in this embodiment with closed slits of different lengths, and curve diagrams of effects shown in FIG. 7 and FIG. 8 are obtained.

Obtained simulation effect parameters of the curve diagrams shown in FIG. 7 and FIG. 8 are shown in Table 2 below (which is understood with reference to FIG. 6*a* and FIG. 6*b*):

TABLE 2

| Parameters | Values | Values |
|---|---|---|
| Length L1 of a closed slit (mm) | 40 | 72 |
| Width w of the closed slit (mm) | 1 | 1 |
| Length L2 of a non-closed slit (mm) | 37 | 37 |
| Width n of the non-closed slit (mm) | 1 | 1 |
| Length L3 of a gap 10 (mm) | 1 | 1 |
| Capacitance value of a capacitor C (F) | ∞ | ∞ |
| Inductance value of an tuning component 16 (inductor) (nH) | ∞ | 1.4 |
| Resonant frequency (GHz) | 2 | 2 |

It should be noted that "∞" in the table may be understood as that a corresponding component (for example, a capacitor C or an inductor L) is not used or disposed.

Refer to FIG. 7 and FIG. 8. FIG. 7 is a curve diagram of an S parameter effect obtained by performing a simulation effect test on an antenna system according to an embodiment of this application, and FIG. 8 is a curve comparison diagram of antenna efficiency obtained by performing a simulation effect test on an antenna system with closed slits of different lengths according to an embodiment of this application.

It can be learned from FIG. 7 that, in a range of an operating frequency band of 1.8 GHz to 2.3 GHz, a value of S11 of the antenna system in this implementation is about −12 dB to −0.01 dB, and an S21 parameter of the antenna system in this implementation is about −37 dB to −25 dB and is less than −25 dB, that is, isolation can reach more than 25 dB. It can be learned that the antenna system in this implementation has high isolation.

It can be learned from FIG. 8 that, in a range of an operating frequency band of 1.85 GHz to 2.3 GHz, when a length of a closed slit of the antenna system in this implementation is 40 mm, system efficiency of the first antenna is about −10 dB to −4.15 dB, and radiation efficiency is about −4.5 dB to −3.8 dB. When a length of a closed slit is 72 mm, system efficiency of the first antenna is about −10 dB to −3.27 dB, and radiation efficiency is about −3.9 dB to −2.5 dB. It should be noted that, because an efficiency curve of the second antenna is similar to an efficiency curve of the first antenna, FIG. 8 shows only an antenna efficiency curve of the first antenna. It can be learned that, in this implementation, both the system efficiency and the radiation efficiency of the antenna system with the closed slit whose length is 72 mm are better than those of the antenna system with the closed slit whose length is 40 mm.

Simulation software is used to perform simulation analysis on an electronic device using an antenna with a closed slit in a reference design and an electronic device using an antenna system with closed slits of different lengths in this embodiment, and SAR value data tables shown in FIG. 9*a* to FIG. 9*c* are obtained.

Obtained simulation effect parameters of the SAR value data tables shown in FIG. 9*a* to FIG. 9*c* are shown in Table 3 below (which is understood with reference to FIG. 3, FIG. 6*a*, and FIG. 6*b*):

TABLE 3

| Parameters | Single antenna with a closed slit | Under a length of a closed slit in this embodiment | Under another length of a closed slit in this embodiment |
|---|---|---|---|
| Length L1 of a closed slit (mm) | 40 | 40 | 72 |
| Width w of the closed slit (mm) | 1 | 1 | 1 |
| Length L2 of a non-closed slit (mm) | / | 37 | 37 |
| Width n of the non-closed slit (mm) | / | 1 | 1 |
| Length L3 of a gap 10 (mm) | / | 1 | 1 |
| Capacitance value of a capacitor C (F) | / | ∞ | ∞ |
| Inductance value of an tuning component 16 (inductor) (nH) | / | ∞ | 1.4 |
| Resonant frequency (GHz) | 2 | 2 | 2 |

In FIG. 9*a* to FIG. 9*c*, SAR (specific absorption rate, English full name "Specific Absorption Rate") refers to electromagnetic power absorbed by a human body tissue of a unit mass, and a unit is W/kg. Internationally, an SAR value is commonly used to measure a thermal effect of electronic device radiation. A normalized SAR value is an SAR value measured when a normalized antenna efficiency value (normalized efficiency shown in the table) is −5 dB. "Back −5 mm" indicates a scenario in which the back of an electronic device is 5 mm away from a body, and "Bottom −5 mm" indicates a scenario in which the bottom of an electronic device is 5 mm away from a body.

It can be learned from FIG. 9*a* that, an SAR value of the single antenna with the closed slit measured in a scenario in which output power is 24 dBm, a resonant frequency is 2 GHz, and the back of the electronic device is −5 mm away from the body is 1.4 W/kg, and an SAR value of the single antenna with the closed slit measured in a scenario in which the bottom of the electronic device is −5 mm away from the body is 0.51 W/kg.

It can be learned from FIG. 9*b* that, in this embodiment, an SAR value measured in a scenario in which a length of the closed slit is 40 mm, output power is 24 dBm, a resonant frequency is 2 GHz, and the back of the electronic device is −5 mm away from the body is 1.37 W/kg, and an SAR value measured in a scenario in which the bottom of the electronic device is −5 mm away from the body is 1.1 W/kg.

It can be learned from FIG. 9*c* that, in this embodiment, an SAR value measured in a scenario in which a length of the closed slit is 72 mm, output power is 24 dBm, a resonant frequency is 2 GHz, and the back of the electronic device is −5 mm away from the body is 0.95 W/kg, and an SAR value measured in a scenario in which the bottom of the electronic device is −5 mm away from the body is 0.57 W/kg.

Therefore, compared with the single antenna with the closed slit, the antenna system in this embodiment can further effectively reduce the SAR value of the antenna.

It can be learned from simulation data in FIG. 7 to FIG. 9*c* that, compared with the single antenna with the closed slit, the antenna system in this embodiment can not only implement high isolation between the first antenna and the second antenna and miniaturize an antenna diameter, but also effectively reduce the SAR value of the antenna. In particular, when the length of the closed slit is 72 mm, the SAR value may even be reduced from 1.4 W/kg to 0.95 W/kg, which is reduced by about 32%.

Figure 10A:
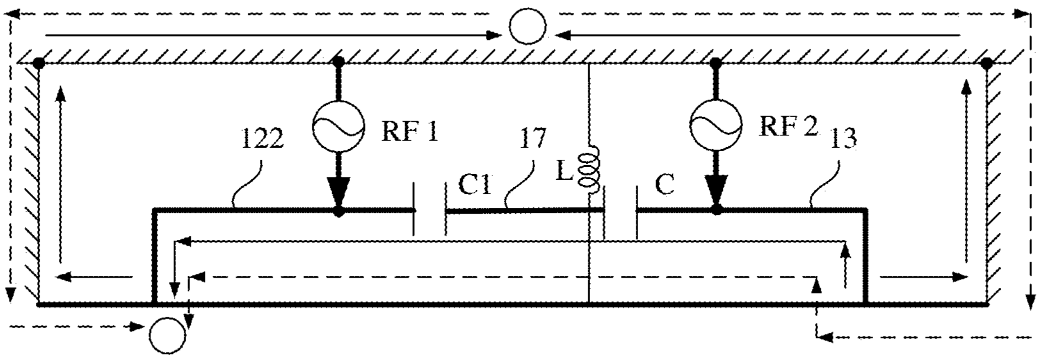
FIG. 10*a* and FIG. 10*b* are respectively schematic diagrams of a first principle structure and a three-dimensional structure of an antenna system according to an embodiment of this application, where there is one suspended radiator section.

As shown in FIG. 10*a*, a structure of an antenna system in this embodiment is basically the same as the structure of the antenna system shown in FIG. 5, and a difference lies in that a second radiator 12 is configured with one or more first slots, and/or a third radiator 13 is configured with one or more second slots, or it is understood that: At least one of the second radiator 12 and the third radiator 13 includes an L-shaped radiator section and a suspended radiator section, a feeding end of a first radio frequency source RF 1 may be connected to the L-shaped radiator section or the suspended radiator section of the second radiator 12, and a feeding end of a second radio frequency source RF 2 may be connected to the L-shaped radiator section or the suspended radiator section of the third radiator 13. It should be understood that the solution in FIG. 10*a* may be combined with the solutions in the foregoing embodiments.

Figure 10B:
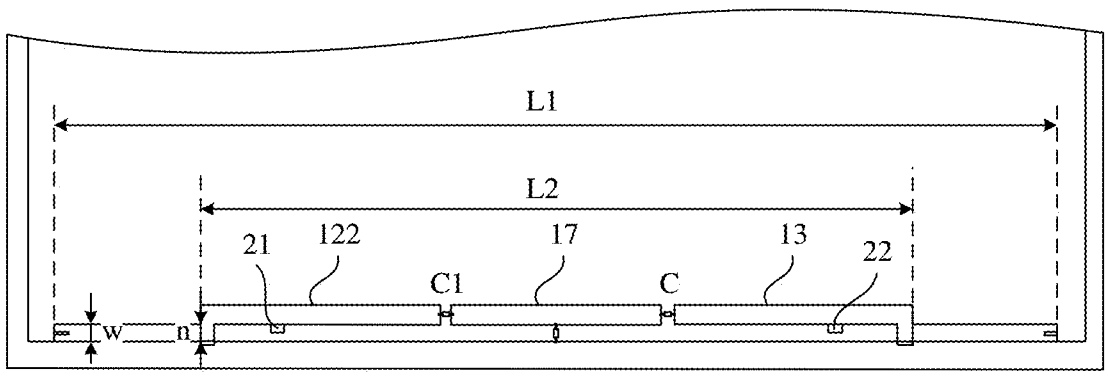

As shown in FIG. 10*a* and FIG. 10*b*, FIG. 10*a* and FIG. 10*b* are respectively schematic diagrams of a first principle structure and a three-dimensional structure of an antenna system according to an embodiment of this application. There is one suspended radiator section.

The third radiator 13 is in an L shape, and the second radiator 12 includes an L-shaped radiator section 122 and a suspended radiator section 17. The suspended radiator section 17 and the L-shaped radiator section 122 are disposed end-to-end and at spacing. An end of the L-shaped radiator section 122 away from the suspended radiator section 17 is a first end of the second radiator 12, and an end of the suspended radiator section 17 away from the L-shaped radiator section 122 is a second end of the second radiator 12.

The second radiator 12 receives a radio frequency signal through the L-shaped radiator section 122. In other words, the feeding end of the first radio frequency source RF 1 is connected to the L-shaped radiator section 122.

Certainly, a person skilled in the art may understand that, in another alternative implementation, the second radiator 12 may be in an L shape, the third radiator 13 includes the L-shaped radiator section and the suspended radiator section 17, an end of the L-shaped radiator section away from the suspended radiator section 17 is a first end of the third radiator 13, and an end of the suspended radiator section 17 away from the L-shaped radiator section is a second end of the third radiator 13. Correspondingly, the third radiator 13 receives a radio frequency signal through the L-shaped radiator section. In other words, the feeding end of the second radio frequency source RF 2 is connected to the L-shaped radiator section.

Further, the suspended radiator section 17 may be connected to the L-shaped radiator section 122 via a capacitor, for example, a capacitor C1. A form of the capacitor is not limited, and the capacitor may be a distributed coupling capacitor, or may be a lumped capacitor.

Figure 10C:
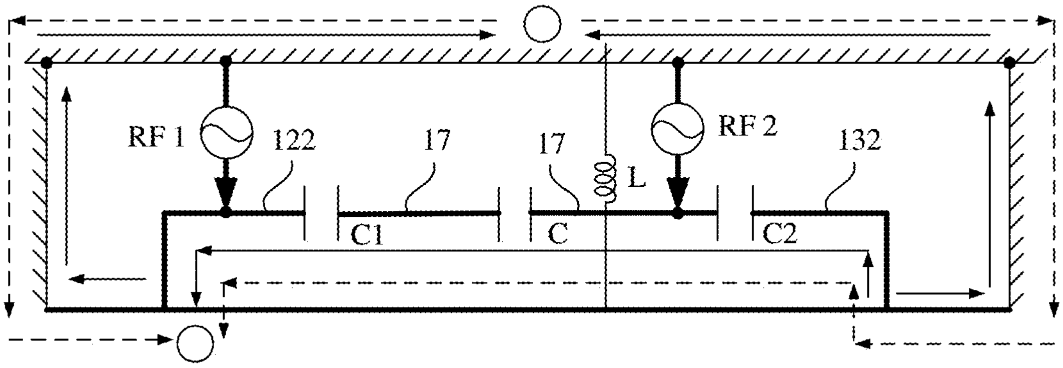
FIG. 10*c* is a schematic diagram of a second principle structure of an antenna system according to an embodiment of this application.

As shown in FIG. 10*c*, FIG. 1*c* is a schematic diagram of a second principle structure of an antenna system according to an embodiment of this application. The second structure is basically the same as the first structure, and a difference lies in that a capacitor is disposed at at least one of a first slot and a second slot. In this implementation, the capacitor is disposed at each first slot and each second slot. Specifically, there are two suspended radiator sections, and the suspended radiator sections are connected via a capacitor C. The second radiator 12 includes an L-shaped radiator section 122 and a suspended radiator section 17 (namely, a suspended radiator section 17 located on a left side in FIG. 10*c*), and the suspended radiator section 17 of the second radiator 12 is connected to the L-shaped radiator section 122 of the second radiator 12 via the capacitor C1. The third radiator 13 includes an L-shaped radiator section 132 and a suspended radiator section 17 (namely, a suspended radiator section 17 located on a right side in FIG. 10*c*), and the suspended radiator section 17 of the third radiator 13 is connected to the L-shaped radiator section 132 of the third radiator 13 via the capacitor C2. The feeding end of the first radio frequency source RF 1 is connected to the L-shaped radiator section 122, and the feeding end of the second radio frequency source RF 2 is connected to the suspended radiator section 17 of the third radiator 13. The suspended radiator section 17 of the second radiator 12 may be used as a radiator of the first antenna to radiate outward, or may be used as a radiator of the second antenna to radiate outwards (in this case, the suspended radiator section 17 of the second radiator 12 is used as another radiator that is in the second antenna and that does not belong to the third radiator).

Figure 11A:
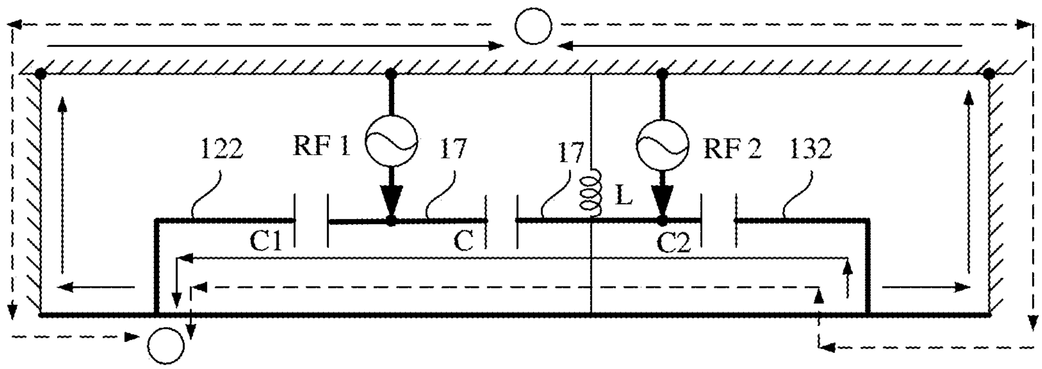
FIG. 11*a* is a schematic diagram of a third principle structure of an antenna system according to an embodiment of this application.
Figure 11B:
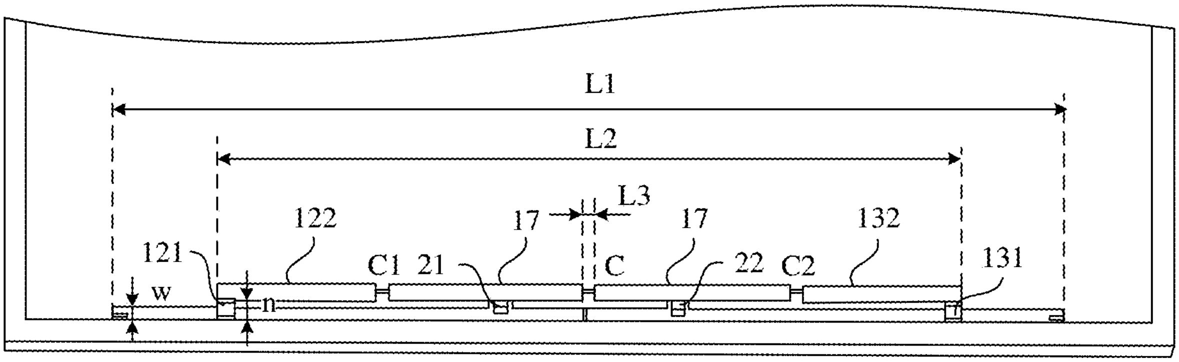
FIG. 11*b* and FIG. 11*c* are both a diagram of a third three-dimensional structure of an antenna system according to an embodiment of this application.
Figure 11C:
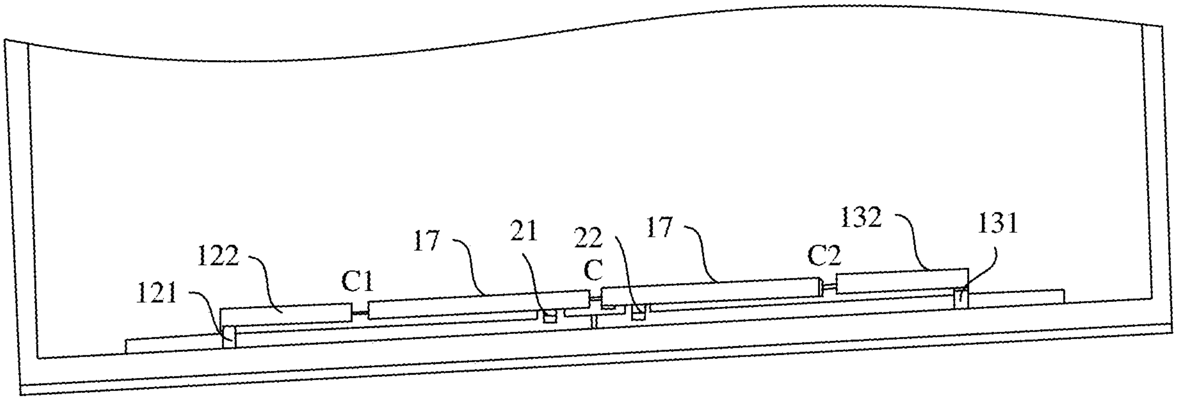

Refer to FIG. 11*a* to FIG. 11*c*. FIG. 11*a* is a schematic diagram of a third principle structure of an antenna system according to an embodiment of this application. FIG. 11*b* and FIG. 11*c* are both diagrams of a third three-dimensional structure of an antenna system according to an embodiment of this application. The third structure is basically the same as the second structure. A difference lies in that a feeding end of a first radio frequency source RF 1 is connected to the suspended radiator section 17 of the second radiator 12, and a feeding end of a second radio frequency source RF 2 is connected to the suspended radiator section 17 of the third radiator 13.

Certainly, a person skilled in the art may understand that, in the second radiator 12 or the third radiator 13, there may be a plurality of suspended radiators. The second radiator 12 is used as an example. When the second radiator 12 includes a plurality of suspended radiator sections, the L-shaped radiator section 122 and the plurality of suspended radiator sections 17 are sequentially disposed end-to-end and at spacing. In this case, an end that is of a last suspended radiator section in the plurality of suspended radiator sections and that is away from the L-shaped radiator section is a second end of the second radiator 12. The feeding end of the first radio frequency source RF 1 may be connected to the L-shaped radiator section 122 or any suspended radiator section 17 in the plurality of suspended radiator sections. Further, each suspended radiator section 17 is connected to an adjacent suspended radiator section via a capacitor, a first suspended radiator section 17 is connected to the L-shaped radiator section via a capacitor, and the last suspended radiator section is connected to a second end of the third radiator 13 via a capacitor C.

A connection relationship in the third radiator is similar to that in the second radiator, and details are not described herein again.

Figure 12:
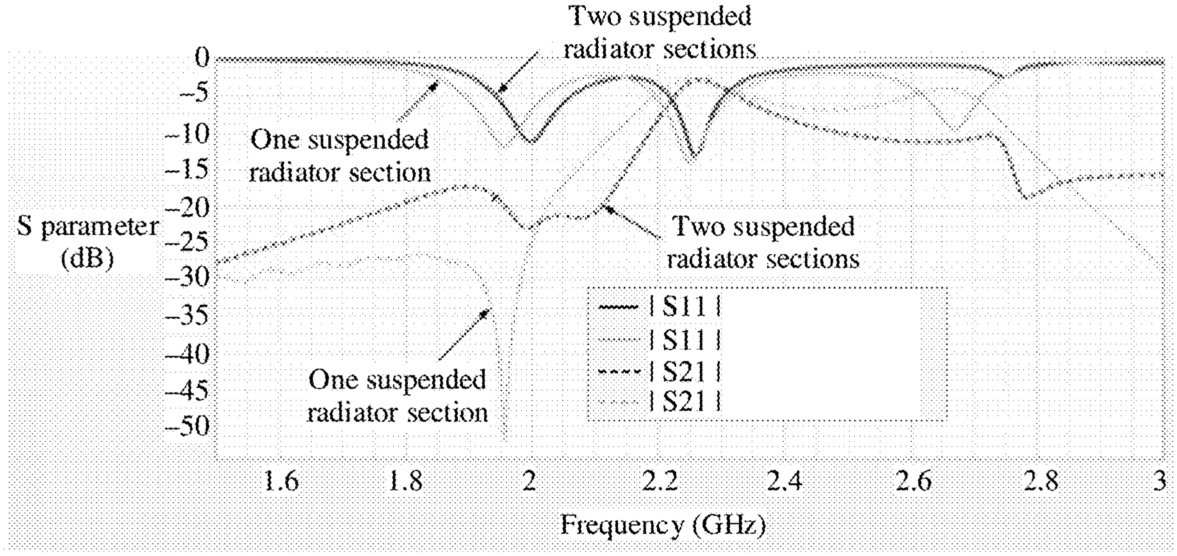
FIG. 12 and FIG. 13 are respectively curve comparison diagrams of S parameter effects and antenna efficiency that are obtained by separately performing a simulation effect test on an antenna system according to an embodiment of this application in a case where there is one suspended radiator section and in a case where there are two suspended radiator sections.
Figure 13:
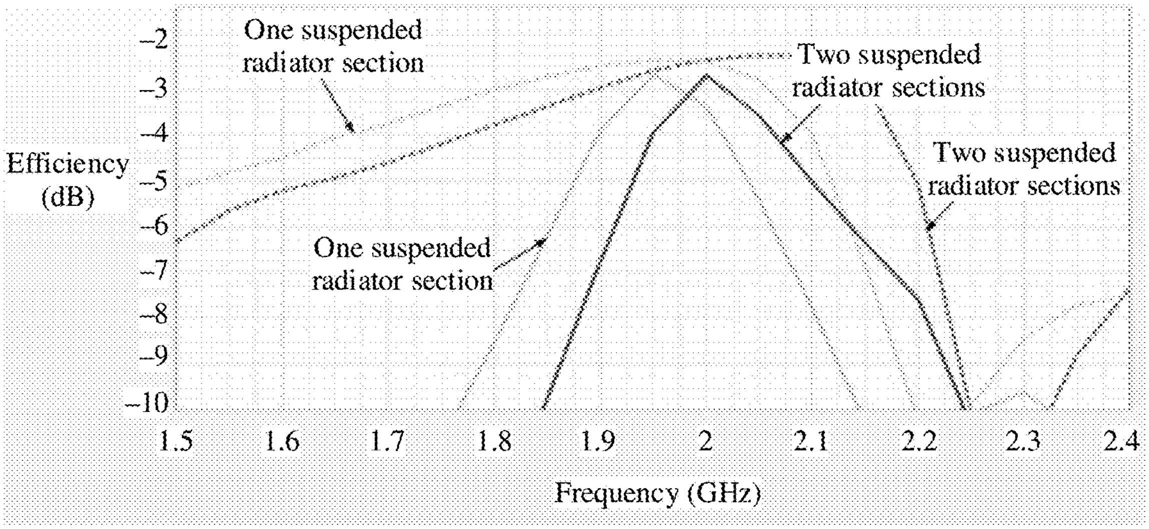

Simulation software is used to perform simulation analysis on the antenna system in this embodiment in a case where there is one suspended radiator section and in a case where there are two suspended radiator sections, and curve diagrams of effects shown in FIG. 12 and FIG. 13 are obtained.

Obtained simulation effect parameters of the curve diagrams shown in FIG. 12 and FIG. 13 are shown in Table 4 below (which is understood with reference to FIG. 10*b* and FIG. 11*b*):

TABLE 4

| Parameters | One suspended radiator section | Two suspended radiator sections |
|---|---|---|
| Location of a feeding end of a first radio frequency source | L-shaped radiator section of a second radiator | L-shaped radiator section of a second radiator |
| Location of a feeding end of a second radio frequency source | L-shaped radiator section of a third radiator | L-shaped radiator section of a third radiator |
| Length L1 of a closed slit (mm) | 72 | 64 |
| Width w of the closed slit (mm) | 1 | 1 |
| Length L2 of a non-closed slit (mm) | 51 | 50 |
| Width n of the non-closed slit (mm) | 1 | 1 |
| Length L3 of a gap 10 (mm) | 1 | 1 |
| Capacitance value of a capacitor (pF) | C = C1 = 0.4 | C1 = C2 = 0.75<br>C = 0.1 |
| Inductance value of an tuning component 16 (inductor) (nH) | 4.8 | 1.7 |
| Resonant frequency (GHz) | 1.95 | 2 |

Refer to FIG. 12 and FIG. 13. FIG. 12 is a curve comparison diagram of S parameter effects obtained by separately performing a simulation effect test on an antenna system according to an embodiment of this application in a case where there is one suspended radiator section and in a case where there are two suspended radiator sections. FIG. 13 is a curve comparison diagram of antenna efficiency obtained by separately performing a simulation effect test on an antenna system according to an embodiment of this application in a case where there is one suspended radiator section and in a case where there are two suspended radiator sections.

It can be learned from FIG. 12 that, in a range of an operating frequency band of 1.8 GHz to 2.1 GHz, when there is one suspended radiator section, a value of S11 of the antenna system in this implementation is about −14 dB to −1 dB; when there are two suspended radiator sections, a value of S11 of the antenna system in this implementation is about −13.5 dB to −0.5 dB; when there is one suspended radiator section, a value of S21 of the antenna system in this implementation is about −54 dB to −26 dB, and is less than −25 dB, to be specific, isolation can reach more than 25 dB; and when there are two suspended radiator sections, a value of S21 of the antenna system in this implementation is about −24 dB to −19 dB, and is less than −20 dB, to be specific, isolation can reach more than 20 dB. It can be learned that the antenna system in this implementation has high isolation.

It can be learned from FIG. 13 that, in a range of an operating frequency band of 1.9 GHz to 2.1 GHz, when there is one suspended radiator section in the antenna system in this implementation, system efficiency of the first antenna is about −4 dB to −2.7 dB, and radiation efficiency is about −2.5 dB to −2.4 dB; and when there are two suspended radiator sections, system efficiency of the first antenna is about −7 dB to −2.7 dB, and radiation efficiency is about −3 dB to −2.5 dB. It should be noted that, because an efficiency curve of the second antenna is similar to an efficiency curve of the first antenna, FIG. 13 shows only an antenna efficiency curve of the first antenna.

Simulation software is used to perform simulation analysis on an electronic device using an antenna system with one suspended radiator section and an electronic device using an antenna system with two suspended radiator sections according to this embodiment, and SAR value data tables shown in FIG. 14*a* and FIG. 14*b* are obtained.

Obtained simulation effect parameters of the SAR value data tables shown in FIG. 14*a* and FIG. 14*b* are shown in Table 5 below (which is understood with reference to FIG. 10*b* and FIG. 11*b*):

TABLE 5

| Parameters | One suspended radiator section | Two suspended radiator sections |
|---|---|---|
| Length L1 of a closed slit (mm) | 72 | 64 |
| Width w of the closed slit (mm) | 1 | 1 |
| Length L2 of a non-closed slit (mm) | 51 | 50 |
| Width n of the non-closed slit (mm) | 1 | 1 |
| Length L3 of a gap 10 (mm) | 1 | 1 |
| Capacitance value of a capacitor C (pF) | C = C1 = 0.4 | C1 = C2 = 0.75<br>C = 0.1 |
| Inductance value of an tuning component 16 (inductor) (nH) | 4.8 | 1.7 |
| Resonant frequency (GHz) | 1.95 | 2 |

It can be learned from FIG. 14*a* that, when there is one suspended radiator section, an SAR value of an antenna measured in a scenario in which output power is 24 dBm, a resonant frequency is 1.95 GHz, and the back of the electronic device is −5 mm away from a body is 0.86 W/kg; and an SAR value of the antenna measured in a scenario in which the bottom of the electronic device is −5 mm away from the body is 0.53 W/kg.

It can be learned from FIG. 14*b* that, when there are two suspended radiator sections, an SAR value of an antenna measured in a scenario in which output power is 24 dBm, a resonant frequency is 2 GHz, and the back of the electronic device is −5 mm away from a body is 0.89 W/kg, and an SAR value of the antenna measured in a scenario in which the bottom of the electronic device is −5 mm away from the body is 0.55 W/kg.

It can be learned that an SAR value of the antenna system in a case where there is one suspended radiator section is lower than that of the antenna system in a case where there are two suspended radiator sections.

Figure 16A:
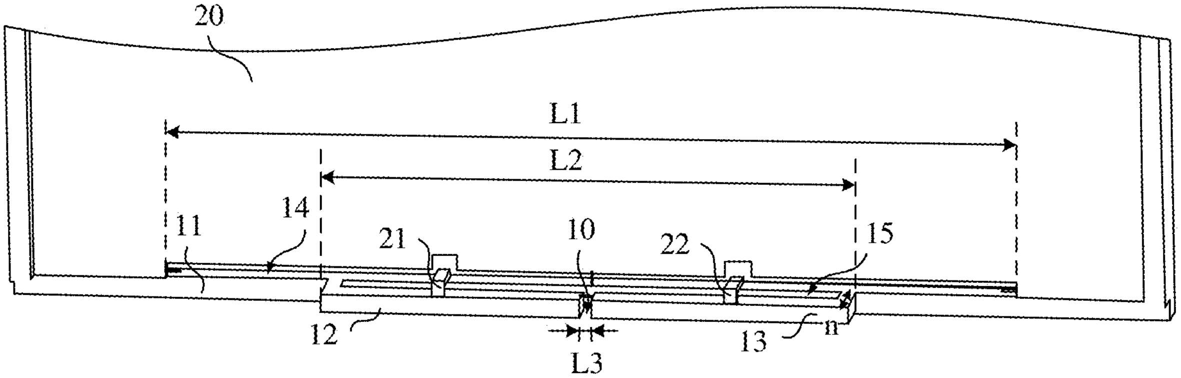
FIG. 16*a* and FIG. 16*b* are both a diagram of a three-dimensional structure of an antenna system according to an embodiment of this application, where both a second radiator and a third radiator are in an L shape, and in a thickness direction of a closed slit, a non-closed slit is located on a side that is of a first radiator and that is away from a ground.
Figure 16B:
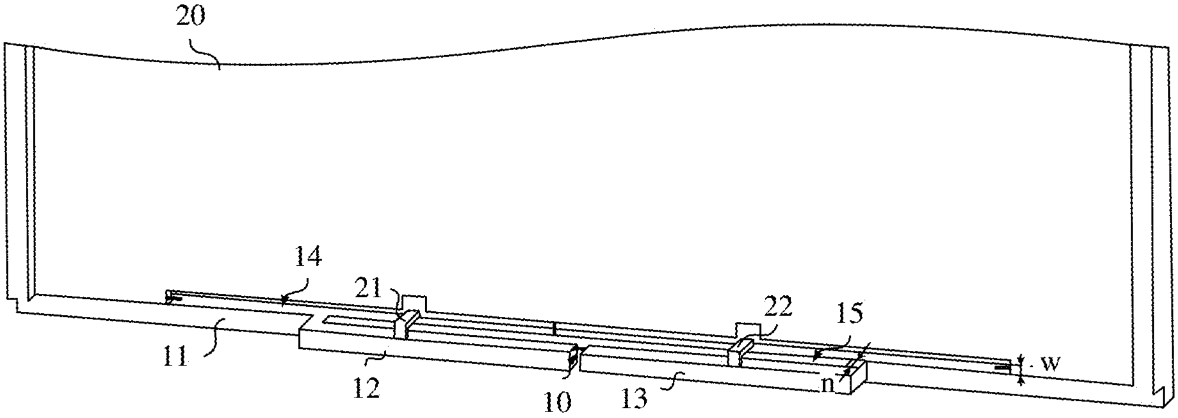

Refer to FIG. 16*a* and FIG. 16*b*. FIG. 16*a* and FIG. 16*b* are both diagrams of a three-dimensional structure of an antenna system according to an embodiment of this application. The structure of the embodiments is basically the same as that of the antenna system shown in FIG. 1, and a difference lies in that:

Both a second radiator 12 and a third radiator 13 are in an L shape, and in a thickness direction of a closed slit (namely, a direction perpendicular to a PCB board 20 in FIG. 16*a*), a non-closed slit 15 partially overlaps a first radiator 11, and is located on a side that is of the first radiator 11 and that is away from a ground (for example, the PCB board 20 shown in FIG. 16*a*). Alternatively, it may be understood that, on the basis of the second radiator 12 and the third radiator 13 in the antenna system shown in FIG. 1, the second radiator 12 and the third radiator 13 in this embodiment rotate 90° around the first radiator 11 in a direction away from the PCB board 20. It should be understood that the solution in FIG. 16*a* may be combined with the solutions in the foregoing embodiments.

This application further provides an electronic device, including the antenna system 1 in any one of the foregoing implementations.

Further, as shown in FIG. 16*a* and FIG. 16*b*, a mobile phone is used as an example of the electronic device. In this implementation, the first radiator 11 may be formed by an outer metal frame of the mobile phone, and the second radiator 12 and the third radiator 13 may be formed by an embedded metal structure part like a metal sheet that is of the mobile phone and that is embedded in a metal frame. A person skilled in the art may understand that the embedded metal structure part is covered inside the mobile phone, and does not affect appearance of the mobile phone.

FIG. 15 shows an antenna with an open slit in a reference design. A single-antenna design may be performed on the antenna with the open slit to obtain a single antenna with the open slit, namely, a case 1, and a dual-antenna design may be performed on the antenna with the open slit to obtain a dual antenna with the open slit, namely, a case 2.

Simulation software is used to perform simulation analysis on the single antenna with the open slit (namely, the case 1) in a reference design, the dual antenna with the open slit (namely, the case 2) in a reference design, and the antenna system in this embodiment, and curve diagrams of effects shown in FIG. 17 to FIG. 28 are obtained.

Figure 17:
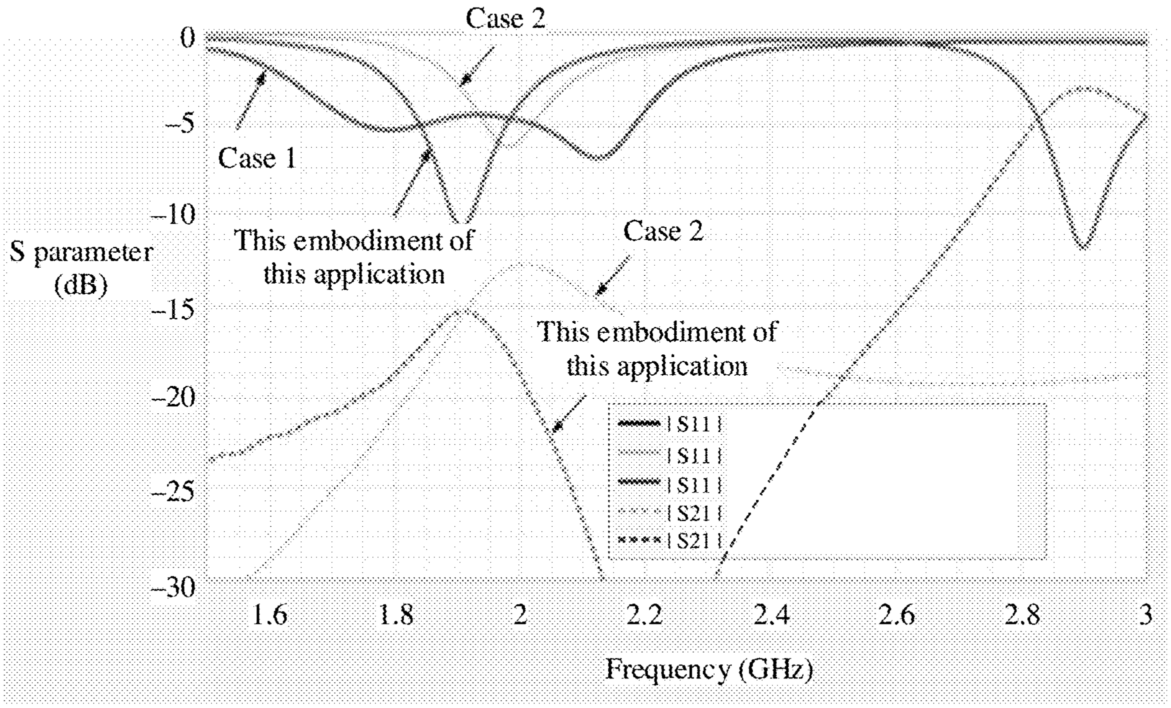
FIG. 17 and FIG. 18 are respectively curve comparison diagrams of S parameter effects and antenna efficiency that are obtained by separately performing a simulation effect test on a single antenna with an open slit (namely, a case 1) in a reference design, a dual antenna with an open slit (namely, a case 2) in a reference design, and an antenna system according to an embodiment of this application.
Figure 18:
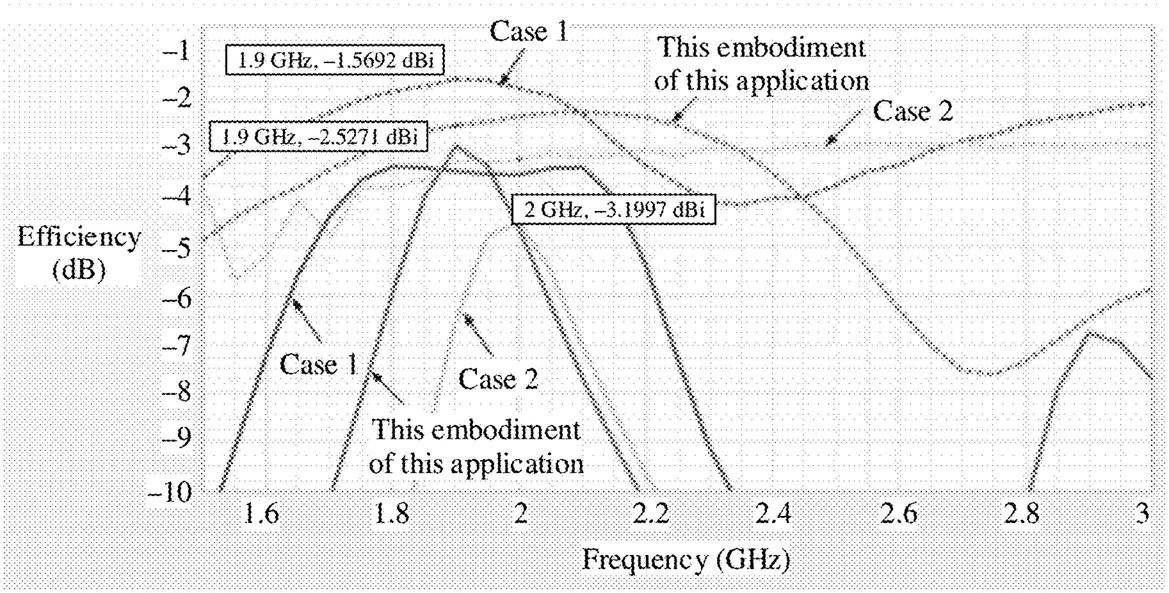

Obtained simulation effect parameters of the curve diagrams shown in FIG. 17 and FIG. 18 are shown in Table 6 below (which is understood with reference to FIG. 15, FIG. 16*a*, and FIG. 16*b*):

TABLE 6

| Parameters | Case 1 | Case 2 | This embodiment |
|---|---|---|---|
| Length L1 of a closed slit (mm) | / | 1 | 58 |
| Width w of the closed slit (mm) | / | / | 1 |
| Length L2 of a non-closed slit (mm) | 38 | 38 | 38 |
| Width n of the non-closed slit (mm) | 1.4 | 1.4 | 1.4 |
| Length L3 of a gap 10 (mm) | 1 | 1 | 1 |
| Capacitance value of a capacitor C (pF) | / | / | 0.1 |
| Inductance value of an tuning component 16 (inductor) (nH) | 1 | / | 16 |
| Resonant frequency (GHz) | 1.85 | 2 | 1.9 |

Refer to FIG. 17 and FIG. 18. FIG. 17 is a curve comparison diagram of S parameter effects obtained by performing a simulation effect test on a single antenna with an open slit (namely, a case 1) in a reference design, a dual antenna with an open slit (namely, a case 2) in a reference design, and an antenna system according to an embodiment of this application. FIG. 18 is a curve comparison diagram of antenna efficiency by performing a simulation effect test on a single antenna with an open slit (namely, a case 1) in a reference design, a dual antenna with an open slit (namely, a case 2) in a reference design, and an antenna system according to an embodiment of this application.

It can be learned from FIG. 17 that, in a range of an operating frequency band of 1.8 GHz to 2.1 GHz, a value of S11 of the single antenna with the open slit (namely, the case 1) is about −5 dB to −4.8 dB, a value of S11 of the dual antenna with the open slit (namely, the case 2) is about −6.5 dB to −1.5 dB, a value of S11 of the antenna system in this implementation is about −11.5 dB to −2.5 dB, a value of S21 of the dual antenna with the open slit (namely, the case 2) is about −21 dB to −13 dB, and a value of S21 of the antenna system in this implementation is about −22 dB to −15.5 dB, that is, isolation can reach more than 20 dB. It can be learned that the antenna system in this implementation has high isolation.

It can be learned from FIG. 18 that, in a range of an operating frequency band of 1.875 GHz to 1.95 GHz, system efficiency of the single antenna with the open slit (namely, the case 1) is −3.5 dB to −3.4 dB, radiation efficiency is −1.8 dB to −1.7 dB, system efficiency of the dual antenna with the open slit (namely, the case 2) is −7.8 dB to −4.8 dB, radiation efficiency is −3.5 dB to −3.4 dB, system efficiency of the antenna system in this implementation is −3.4 dB to −3 dB, and radiation efficiency is −3.8 dB to −2.5 dB. It should be noted that, because an efficiency curve of a second antenna of the antenna system in this implementation is similar to an efficiency curve of a first antenna, FIG. 18 shows only an antenna efficiency curve of the first antenna.

Simulation software is used to perform simulation analysis on an electronic device using the single antenna with the open slit (namely, the case 1) in a reference design and an electronic device using the antenna system in this embodiment of this application, and SAR value data tables shown in FIG. 19*a* and FIG. 19*b* are obtained.

Obtained simulation effect parameters of the SAR value data tables shown in FIG. 19*a* and FIG. 19*b* are shown in Table 7 below (which is understood with reference to FIG. 15 and FIG. 16*a*):

TABLE 7

| Parameters | Single antenna with an open slit | This embodiment |
|---|---|---|
| Length L1 of a closed slit (mm) | / | 58 |
| Width w of the closed slit (mm) | / | 1 |
| Length L2 of a non-closed slit (mm) | 38 | 38 |
| Width n of the non-closed slit (mm) | 1.4 | 1.4 |
| Length L3 of a gap 10 (mm) | 1 | 1 |
| Capacitance value of a capacitor C (pF) | / | 0.1 |
| Inductance value of an tuning component 16 (inductor) (nH) | / | 16 |
| Resonant frequency (GHz) | 1.85 | 1.9 |

It can be learned from FIG. 19*a* that an SAR value of the single antenna with the open slit measured in a scenario in which output power is 24 dBm, a resonant frequency is 1.85 GHz, and the back of the electronic device is −5 mm away from a body is 0.85 W/kg, and an SAR value of the single antenna with the open slit measured in a scenario in which the bottom of the electronic device is −5 mm away from the body is 1.31 W/kg.

It can be learned from FIG. 19*b* that, in this embodiment, an SAR value measured in a scenario in which output power is 24 dBm, a resonant frequency is 1.9 GHz, and the back of the electronic device is −5 mm away from a body is 0.82 W/kg, and an SAR value measured in a scenario in which the bottom of the electronic device is −5 mm away from the body is 0.93 W/kg.

It can be learned that, compared with the single antenna with the open slit (the case 1), the SAR value of the antenna system in this embodiment is lower.

FIG. 20 is a diagram of a three-dimensional structure of an antenna system according to an embodiment of this application. There are two suspended radiation sections. A structure of this embodiment is basically the same as that of the antenna system shown in FIG. 16*a*, and a difference lies in that the antenna system further includes the two suspended radiation sections. The suspended radiator sections are connected via a capacitor C. A second radiator 12 includes an L-shaped radiator section 122 and a suspended radiator section 17 (namely, a suspended radiator section 17 on a left side in FIG. 20), and a third radiator 13 includes an L-shaped radiator section 132 and a suspended radiator section 17 (namely, a suspended radiator section 17 on a right side in FIG. 20). A feeding end of a first radio frequency source RF 1 is connected to the L-shaped radiator section 122, and a feeding end of a second radio frequency source RF 2 is connected to the L-shaped radiator section 132. It should be understood that the solution in FIG. 20 may be combined with the solutions in the foregoing embodiments.

Figure 21:
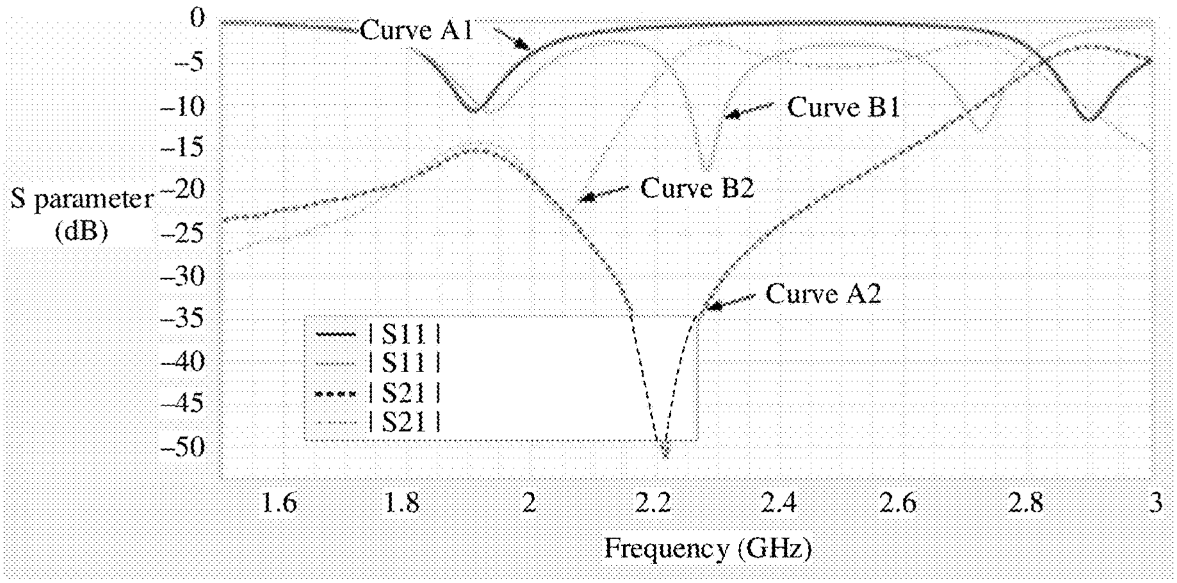
FIG. 21 and FIG. 22 are respectively curve comparison diagram of an S parameter effect and antenna efficiency that are obtained by performing a simulation effect test on an antenna system according to an embodiment of this application.
Figure 22:
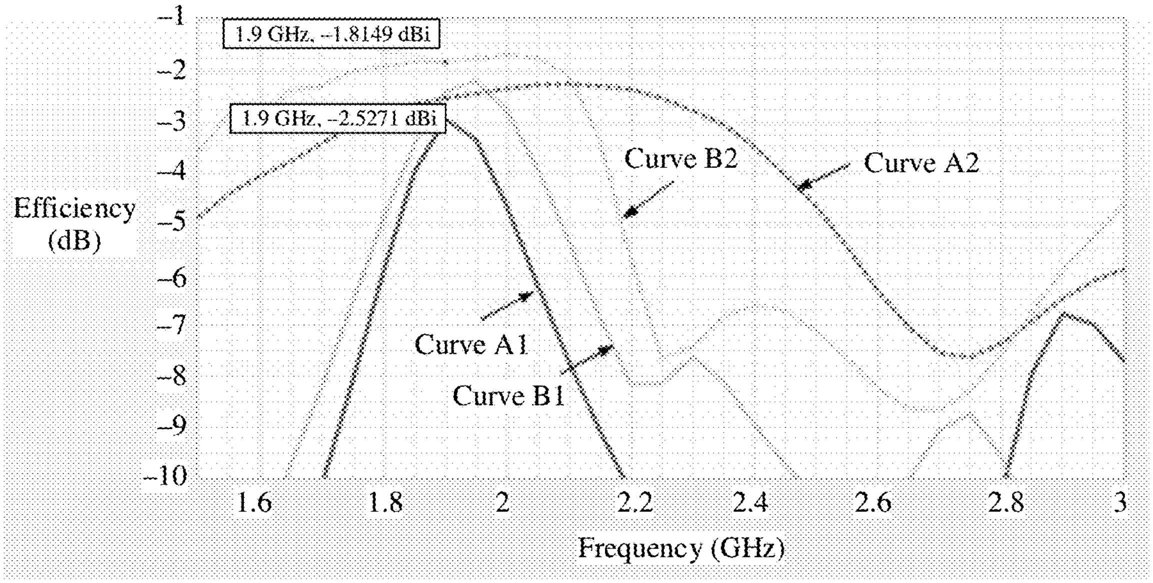

Simulation software is used to perform simulation analysis on the antenna system in this embodiment of this application, and curve diagrams of effects shown in FIG. 21 and FIG. 22 are obtained.

Obtained simulation effect parameters of the curve diagrams shown in FIG. 21 and FIG. 22 are shown in Table 8 below (which is understood with reference to FIG. 16*a* and FIG. 20):

TABLE 8

| Parameters | An implementation | Another implementation |
|---|---|---|
| A quantity of suspended radiator sections | 0 | 2 |
| Length L1 of a closed slit (mm) | 58 | 70 |
| Width w of the closed slit (mm) | 1 | 1 |
| Length L2 of a non-closed slit (mm) | 38 | 56 |
| Width n of the non-closed slit (mm) | 1.4 | 1.4 |
| Length L3 of a gap 10 (mm) | 1 | 1 |
| Capacitance value of a capacitor C (pF) | / | C1 = C2 = 1.1<br>C = 0.1 |
| Inductance value of an tuning component 16 (inductor) (nH) | / | 2.5 |
| Resonant frequency (GHz) | 1.9 | 1.95 |

Refer to FIG. 21 an FIG. 22. FIG. 21 is a curve comparison diagram of an S parameter effect obtained by performing a simulation effect test on an antenna system according to an embodiment of this application, and FIG. 22 is a curve comparison diagram of antenna efficiency obtained by performing a simulation effect test on an antenna system according to an embodiment of this application.

In FIG. 21, a curve A1 and a curve A2 respectively represent a value of S11 and a value of S21 of the antenna system in an implementation of this embodiment, and a curve B1 and a curve B2 respectively represent a value of S11 and a value of S21 of the antenna system in another implementation of this embodiment. It can be learned from FIG. 21 that, in a range of an operating frequency band of 1.8 GHz to 2 GHz, in an implementation, a value of S11 of the antenna system in this embodiment is about −10.5 dB to −2.5 dB, and a value of S21 of the antenna system in this embodiment is about −19 dB to −15 dB. In another implementation, a value of S11 of the antenna system in this embodiment is about −10.5 dB to −2.5 dB, and a value of S21 of the antenna system in this embodiment is about −19 dB to −14 dB.

In FIG. 22, a curve A1 and a curve A2 respectively represent system efficiency and radiation efficiency of the antenna system in an implementation of this embodiment, and a curve B1 and a curve B2 respectively represent system efficiency and radiation efficiency of the antenna system in another implementation of this embodiment. It can be learned from FIG. 22 that, in a range of an operating frequency band of 1.825 GHz to 1.95 GHz, in an implementation, system efficiency of this embodiment is −5 dB to −3 dB, and radiation efficiency is −2.7 dB to −2.4 dB. In another implementation, system efficiency of the antenna system in this embodiment is −4 dB to −2.2 dB, and radiation efficiency is −1.85 dB to −1.8 dB. It should be noted that, because an efficiency curve of a second antenna of the antenna system in this implementation is similar to an efficiency curve of a first antenna, FIG. 22 shows only an antenna efficiency curve of the first antenna.

Figures 23A, 23B, 24A:
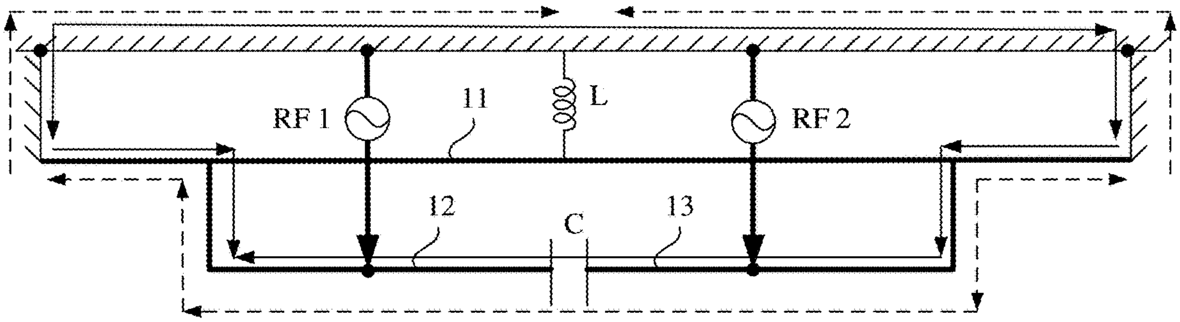
FIG. 23*a* and FIG. 23*b* are respectively SAR value data tables obtained by performing a simulation effect test on an electronic device using an antenna system according to an embodiment of this application.
FIG. 24*a* and FIG. 24*b* are schematic diagrams of a principle structure and a three-dimensional structure of an antenna system according to an embodiment of this application, where in a width direction of a closed slit, a non-closed slit is located on a side that is of a first radiator and that is away from the closed slit, and both the first radiator and a second radiator are in an L shape.

Simulation software is used to perform simulation analysis on an electronic device using the antenna system in this embodiment, and SAR value data tables shown in FIG. 23*a* and FIG. 23*b* are obtained.

Obtained simulation effect parameters of the SAR value data tables shown in FIG. 23*a* and FIG. 23*b* are shown in Table 9 below (which is understood with reference to FIG. 6*a* and FIG. 20):

TABLE 9

| Parameters | An implementation | Another implementation |
|---|---|---|
| A quantity of suspended radiator sections | 0 | 2 |
| Length L1 of a closed slit (mm) | 58 | 70 |
| Width w of the closed slit (mm) | 1 | 1 |
| Length L2 of a non-closed slit (mm) | 38 | 56 |
| Width n of the non-closed slit (mm) | 1.4 | 1.4 |
| Length L3 of a gap 10 (mm) | 1 | 1 |
| Capacitance value of a capacitor C (pF) | 0.1 | C1 = C2 = 1.1<br>C = 0.1 |
| Inductance value of an tuning component 16 (inductor) (nH) | 16 | 2.5 |
| Resonant frequency (GHz) | 1.9 | 1.95 |

It can be learned from FIG. 23*a* that, in an implementation, an SAR value of this embodiment measured in a scenario in which output power is 24 dBm, a resonant frequency is 1.9 GHz, and the back of the electronic device is −5 mm away from a body is 0.82 W/kg, and an SAR value of the antenna system in this embodiment measured in a scenario in which the bottom of the electronic device is −5 mm away from the body is 0.93 W/kg.

It can be learned from FIG. 23*b* that, in another implementation, an SAR value of this embodiment measured in a scenario in which output power is 24 dBm, a resonant frequency is 1.95 GHz, and the back of the electronic device is −5 mm away from a body is 0.66 W/kg, and an SAR value of the antenna system in this embodiment measured in a scenario in which the bottom of the electronic device is −5 mm away from the body is 0.57 W/kg.

Therefore, compared with the antenna system in the implementation of this embodiment, the antenna system in the another implementation of this embodiment has a lower SAR value.

Figure 24B:
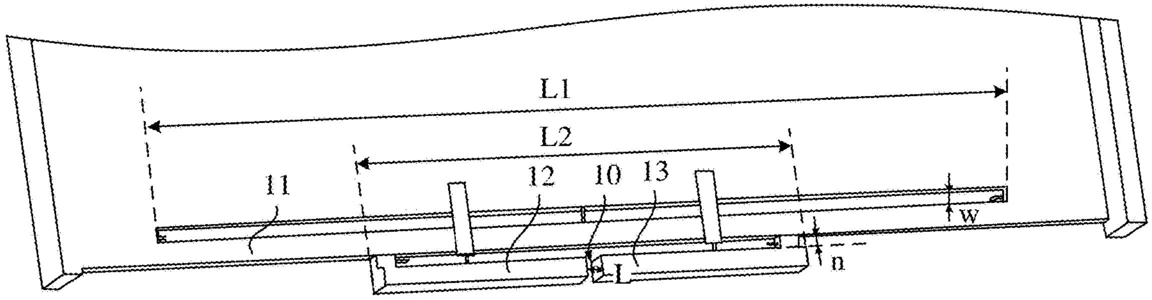

Refer to FIG. 24*a* and FIG. 24*b*. FIG. 24*a* is a schematic diagram of a principle structure of an antenna system according to an embodiment of this application, and FIG. 24*b* is a schematic diagram of a three-dimensional structure of an antenna system according to an embodiment of this application.

Both a second radiator 12 and a third radiator 13 are in an L shape, and in a width w direction of a closed slit, a non-closed slit 15 is located on a side that is of a first radiator 11 and that is away from a closed slit 14. Alternatively, it may be understood that, on the basis of the second radiator 12 and the third radiator 13 in the antenna system shown in FIG. 5, the second radiator 12 and the third radiator 13 in this embodiment rotate 90° around the first radiator 11 in a direction away from a PCB board 20.

This application further provides an electronic device, including the antenna system 1 in any one of the foregoing implementations.

Further, as shown in FIG. 20, a mobile phone is used as an example of the electronic device. A first radiator 11 in this embodiment may be formed by a metal battery cover, a PCB board, a middle frame of a structure part, an FPC board, or a copper foil in the mobile phone. For example, a closed slit is directly processed on the metal battery cover or the PCB board, and the first radiator 11 is further formed on the metal battery cover or the PCB board. The second radiator 12 and the third radiator 13 may be formed by a metal frame of the mobile phone or an embedded metal structure part embedded in the metal frame, or may be formed on a support of the electronic device through a laser direct structuring process, or may be attached on a structure part near an antenna through an FPC process, for example, on a support or a battery cover of the mobile phone.

Figure 25A:
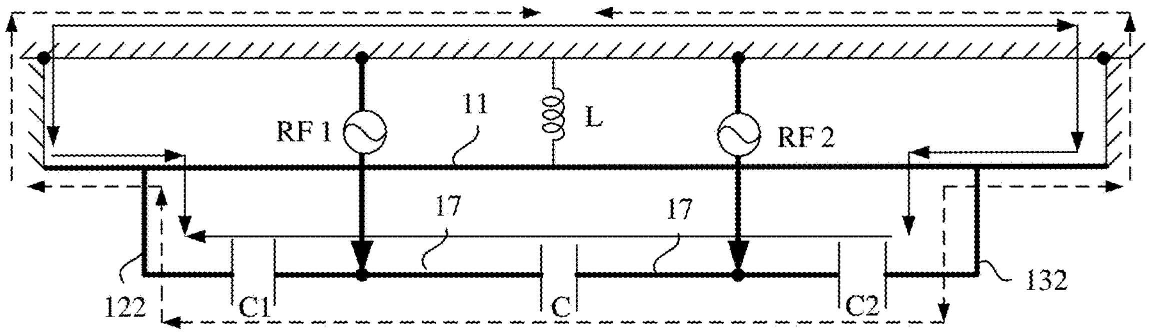
FIG. 25*a* and FIG. 25*b* are schematic diagrams of two principle structures of an antenna system according to an embodiment of this application, where there are two suspended radiator sections.
Figure 25B:
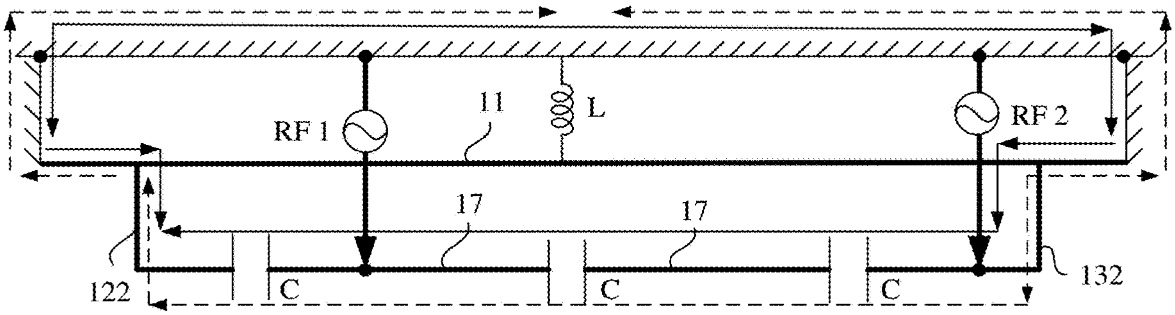

Further, refer to FIG. 25*a* and FIG. 25*b*. FIG. 25*a* is a schematic diagram of a principle structure of an antenna system according to an embodiment of this application, and FIG. 25*b* is a schematic diagram of another principle structure of an antenna system according to an embodiment of this application.

The structure of this embodiment is basically the same as that of the antenna system shown in FIG. 24*a*, and a difference lies in that the antenna system further includes two suspended radiator sections. The suspended radiator sections are connected via a capacitor C. A second radiator 12 includes an L-shaped radiator section 122 and a suspended radiator section 17 (namely, a suspended radiator section 17 located on a left side in FIG. 25*a*), the suspended radiator section 17 of the second radiator 12 is connected to the L-shaped radiator section 122 of the second radiator 12 via a capacitor C1, and a third radiator 13 includes an L-shaped radiator section 132 and a suspended radiator section 17 (namely, a suspended radiator section 17 located on a right side in FIG. 25*a*). The suspended radiator section 17 of the third radiator 13 is connected to the L-shaped radiator section 132 of the third radiator 13 via a capacitor C2. In a first structure, as shown in FIG. 25*a*, a feeding end of a first radio frequency source RF 1 is connected to the suspended radiator section 17 of the second radiator 12, and a feeding end of a second radio frequency source RF 2 is connected to the suspended radiator section 17 of the third radiator 13. In a second structure, as shown in FIG. 25*b*, a feeding end of a first radio frequency source RF 1 is connected to a suspended radiator section 17 of a second radiator 12, and a feeding end of a second radio frequency source RF 2 is connected to an L-shaped radiator section 132 of a third radiator 13. It should be understood that the solution in FIG. 24*a* may be combined with the solutions in the foregoing embodiments.

This application further provides an electronic device, including the antenna system 1 in any one of the foregoing implementations.

Figure 26:
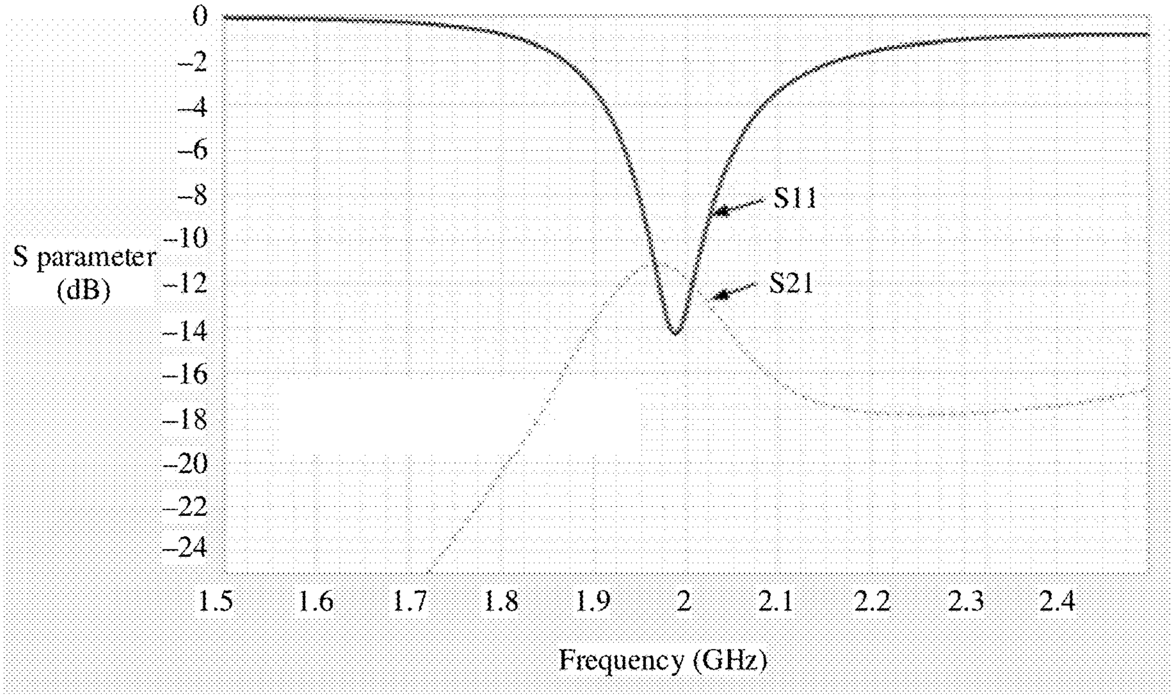
FIG. 26 and FIG. 27 are respectively curve diagrams of an S parameter effect and antenna efficiency that are obtained by performing simulation effect simulation on an antenna system according to an embodiment of this application.
Figure 27:
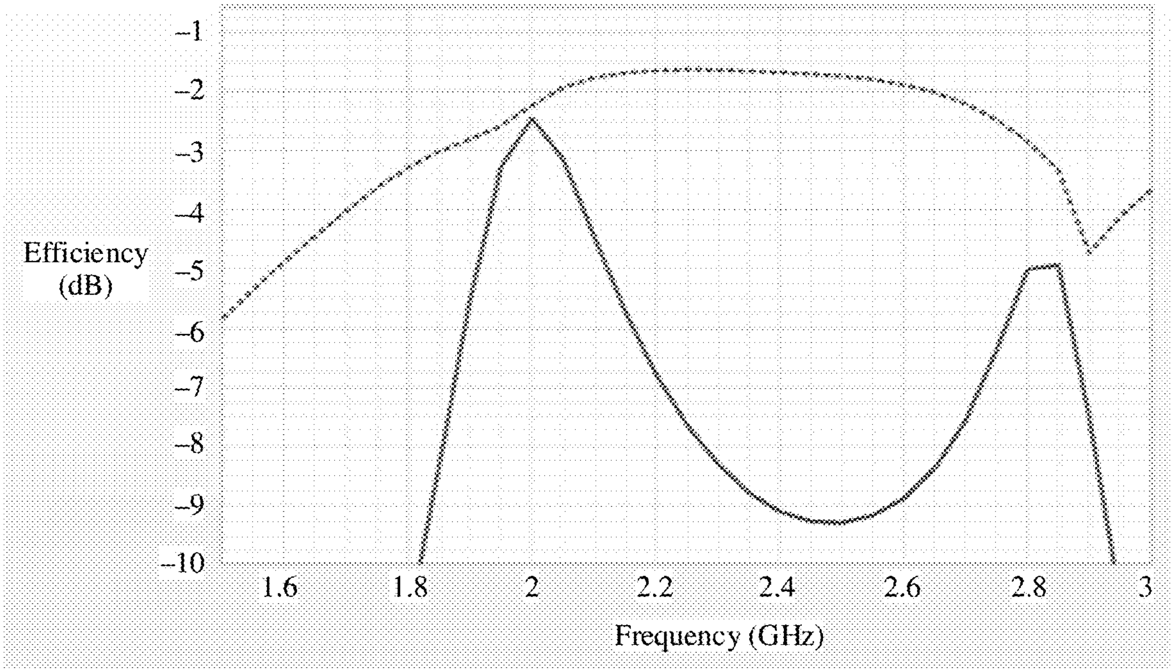

Simulation software is used to perform simulation analysis on the antenna system in this embodiment, and curve diagrams of effects shown in FIG. 26 and FIG. 27 are obtained.

Obtained simulation effects of the curve diagrams shown in FIG. 26 and FIG. 27 are shown in Table 10 below (which is understood with reference to FIG. 24*b*):

TABLE 10

| Parameters | Values |
|---|---|
| Length L1 of a closed slit (mm) | 62 |
| Width w of the closed slit (mm) | 1 |
| Length L2 of a non-closed slit (mm) | 31 |
| Width n of the non-closed slit (mm) | 1.4 |
| Length L3 of a gap 10 (mm) | 1 |
| Resonant frequency (GHz) | 2 |
| Capacitance value of a capacitor C (pF) | 0.7 |
| Inductance value of an tuning component 16 (inductor) (nH) | 0.2 |

Refer to FIG. 26 to FIG. 27. FIG. 26 is a curve diagram of an S parameter effect obtained by performing simulation effect simulation on an antenna system according to an embodiment of this application, and FIG. 27 is a curve comparison diagram of antenna efficiency obtained by separately performing simulation effect simulation on an antenna system according to an embodiment of this application.

It can be learned from FIG. 26 that, in a range of an operating frequency band of 1.9 GHz to 2 GHz, a value of S11 of the antenna system in this embodiment is about −3.6 dB to −14.2 dB, and a value of S21 is about −14 dB to −12 dB.

It can be learned from FIG. 27 that, in a range of an operating frequency band of 1.9 GHz to 2 GHz, system efficiency of the antenna system in this embodiment is −4 dB to −2.5 dB, and radiation efficiency is −2.5 dB to −2.3 dB. It should be noted that, because an efficiency curve of a second antenna of the antenna system in this embodiment is similar to an efficiency curve of a first antenna, FIG. 27 shows only an antenna efficiency curve of the first antenna.

Figure 28A:
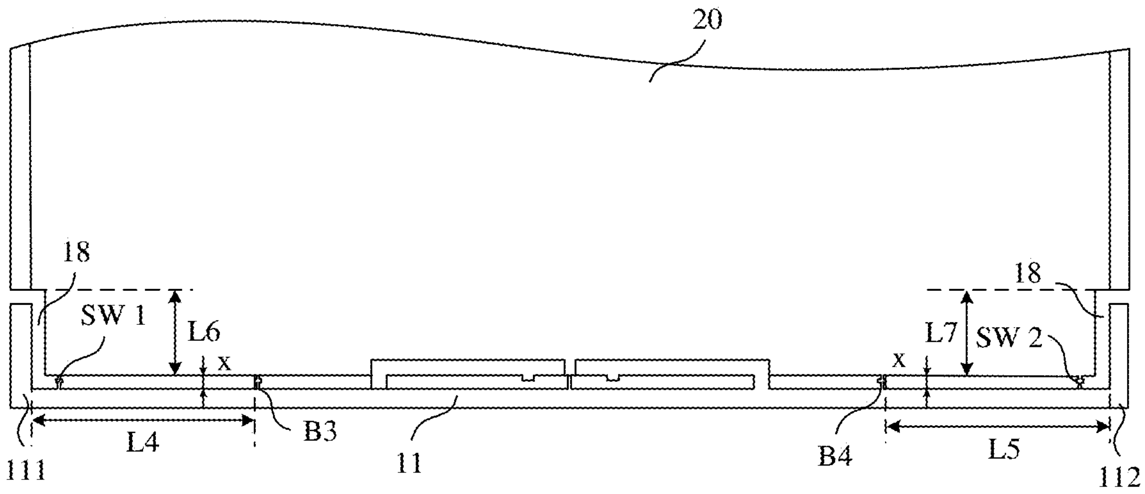
FIG. 28*a* is a schematic diagram of a three-dimensional structure of an antenna system according to an embodiment of this application.
Figure 28B:
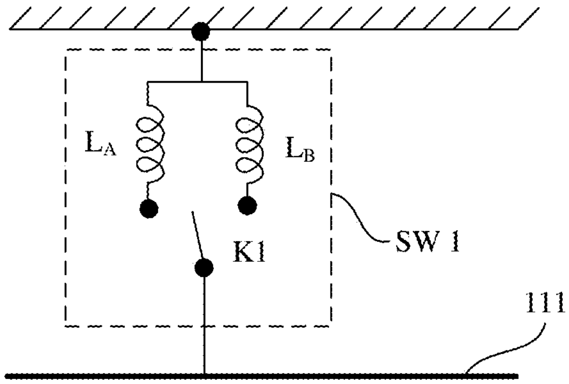
FIG. 28*b* and FIG. 28*c* are respectively schematic diagrams of principle structures of a switch circuit SW 1 and a switch circuit SW 2 of an antenna system according to an embodiment of this application.

Refer to FIG. 28*a* and FIG. 28*b*. FIG. 28*a* is a schematic diagram of a three-dimensional structure of an antenna system according to an embodiment of this application. The structure of this embodiment is basically the same as that of the antenna system shown in FIG. 1, and a difference lies in that:

The antenna system 1 further includes a radiating stub 111 and a radiating stub 112 that are disposed at two ends of a first radiator 11. Both the radiating stub 111 and the radiating stub 112 extend in a direction away from the first radiator 11, and both ends of the radiating stub 111 and the radiating stub 112 that are away from the first radiator 11 are free ends.

A slot is formed between the radiating stub 111 and a PCB board 20 and between the radiating stub 112 and the PCB board 20. Specifically, a slot 18 on a left side of FIG. 28*a* is formed between the radiating stub 111 and the PCB board 20, and a slot 18 on a right side of FIG. 28*a* is formed between the radiating stub 112 and the PCB board 20. It should be understood that the solution in FIG. 28*a* may be combined with the solutions in the foregoing embodiments.

Further, in this embodiment, both the radiating stub 111 and the radiating stub 112 are in an L shape. Both a horizontal part of the radiating stub 111 and a horizontal part of the radiating stub 112 are located on a same side as the first radiator 11, a vertical part of the radiating stub 111 is located on a first side different from the first radiator 11, and a vertical part of the radiating stub 112 is located on a second side different from the first radiator 11.

Figure 28C:
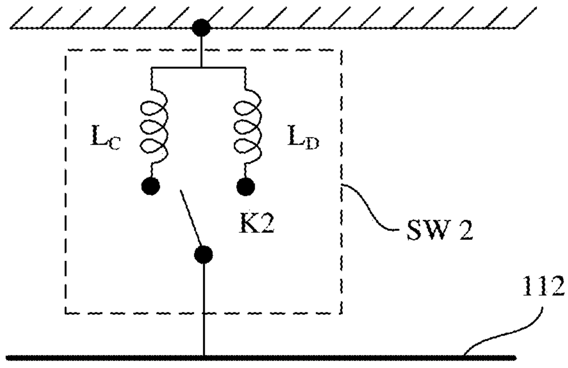

Further, refer to FIG. 28*b* and FIG. 28*c*. FIG. 28*b* and FIG. 28*c* are respectively schematic diagrams of principle structures of a switch circuit SW 1 and a switch circuit SW 2 in an antenna system according to an embodiment of this application. The antenna system 1 in this embodiment further includes the switch circuit SW 1 connected between a radiating stub 111 and a PCB board 20 and the switch circuit SW 2 connected between a radiating stub 112 and the PCB board 20.

The switch circuit SW 1 includes a switch K1, an inductor $L_A$, and an inductor $L_B$. One end of the switch K1 is connected to the radiating stub 111, and one end of the inductor $L_A$ and one end of the inductor $L_B$ are connected to the PCB board 20. The switch K1 can be switched between a first location and a second location. When the switch K1 is in the first location, the other end of the switch K1 is connected to the other end of the inductor $L_A$. In this case, the inductor $L_A$ is electrically connected between the PCB board 20 and the radiating stub 111, and the switch circuit SW 1 is in a first connection state. When the switch K1 is in the second location, the other end of the switch K1 is connected to the other end of the inductor $L_B$. In this case, the inductor $L_B$ is electrically connected between the PCB board 20 and the radiating stub 111, and the switch circuit SW 1 is in a second connection state.

An operating principle of the switch circuit SW 2 is similar to that of the switch circuit SW 1, and may be understood with reference to the foregoing description and FIG. 28*c*. Details are not described herein again. When an inductor $L_C$ is electrically connected between the PCB board 20 and the radiating stub 112, the switch circuit SW 2 is in a first connection state, and when an inductor $L_D$ is electrically connected between the PCB board 20 and the radiating stub 112, the switch circuit SW 2 is in a second connection state.

This application further provides an electronic device, including the antenna system 1 in any one of the foregoing implementations.

Figure 29:
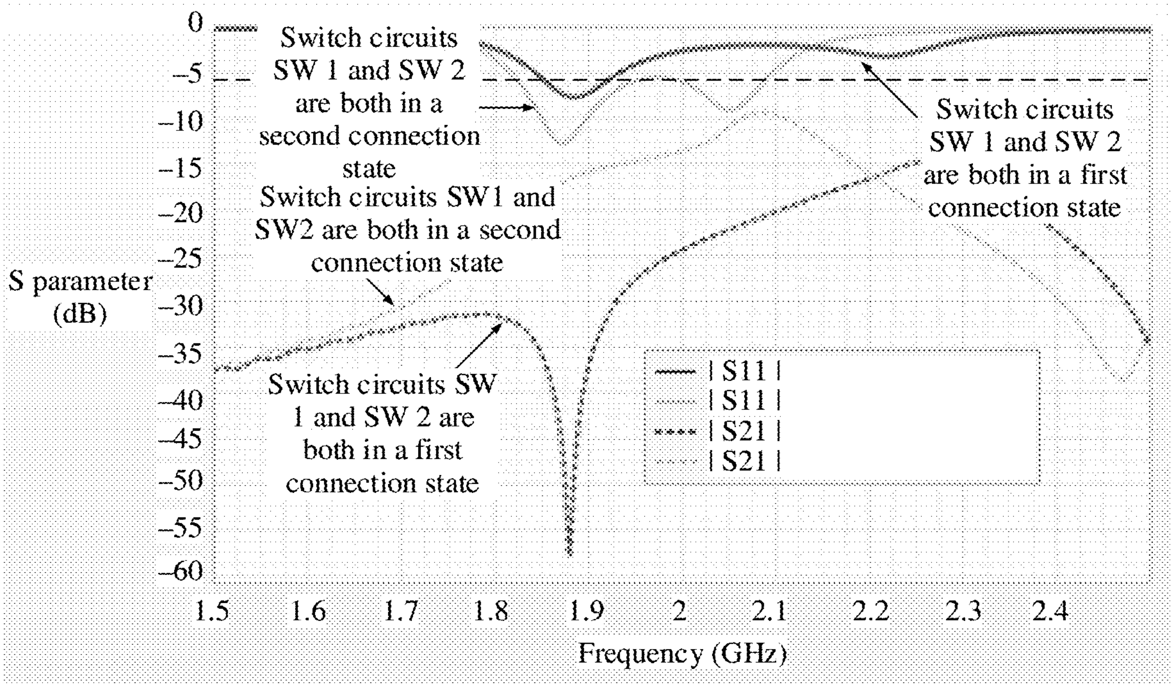
FIG. 29 is a curve diagram of S parameter effects obtained by performing simulation effect simulation on an antenna system according to an embodiment of this application when a switch circuit SW 1 is in a first connection state and a switch circuit SW 2 is in a second connection state.

Simulation software is used to perform simulation analysis on the antenna system of this embodiment when the switch circuit SW 1 and the switch circuit SW 2 are both in the first connection state and in the second connection state, and a curve diagram of an effect shown in FIG. 29 is obtained.

Obtained simulation effect parameters of the curve diagram shown in FIG. 29 are shown in Table 11 (which is understood with reference to FIG. 28*a* to FIG. 28*c*). A length and a width of a closed slit, a length and a width of a non-closed slit, a length of a gap, and a capacitance parameter in the antenna system are the same as those in the structure shown in FIG. 1 in this application. Therefore, for specific values, refer to Table 1 above.

TABLE 11

| Parameters | Switch circuits SW 1 and SW 2 are both in a first connection state | Switch circuits SW 1 and SW 2 are both in a second connection state |
|---|---|---|
| Inductors $L_A$ and $L_C$ (nH) | 5 | / |
| Inductors $L_B$ and $L_D$ (nH) | / | 10 |
| Lengths of horizontal parts of a slot 18: L4 and L5 (mm) | L4 = L5 = 20 | L4 = L5 = 20 |
| Lengths of vertical parts of the slot 18: L6 and L7 (mm) | L6 = L7 = 10 | L6 = L7 = 10 |
| Width × of the slot 18 (mm) | 1 | 1 |

Figure 30:
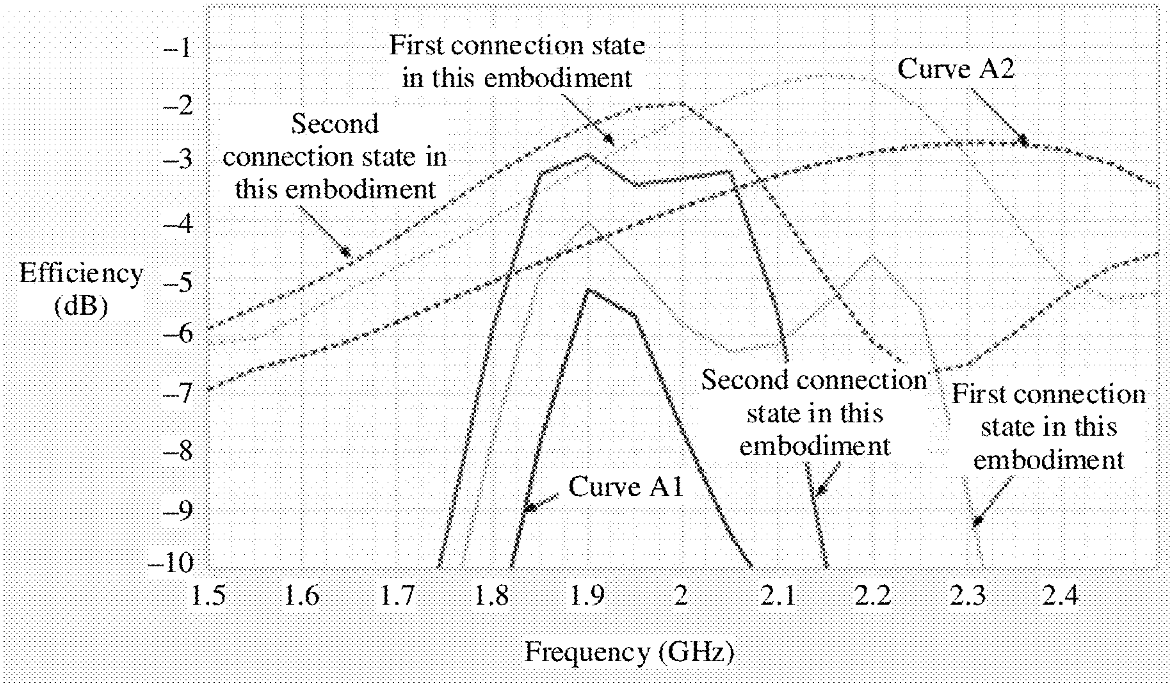
FIG. 30 is a curve comparison diagram of antenna efficiency obtained by performing a simulation effect test on an antenna system according to an embodiment of this application when both a switch circuit SW 1 and a switch circuit SW 2 are in a first connection state and in a second connection state.

Refer to FIG. 29 and FIG. 30. FIG. 29 is a curve diagram of S parameter effects obtained by separately performing simulation effect simulation when both a switch circuit SW 1 and a switch circuit SW 2 in an antenna system according to an embodiment of this application are in a first connection state and in a second connection state, and FIG. 30 is a curve comparison diagram of antenna efficiency obtained by separately performing a simulation effect test on the antenna system shown in FIG. 1 of this application when both a switch circuit SW 1 and a switch circuit SW 2 in an antenna system according to an embodiment of this application are in a first connection state and in a second connection state. For simulation parameters of the antenna system shown in FIG. 1, refer to Table 1 above.

It can be learned from FIG. 29 that, in the antenna system shown in FIG. 1 provided in this embodiment, regardless of whether the switch circuits SW 1 and SW 2 each are in the first connection state or the second connection state, each antenna in the antenna system can generate two resonances (namely, double resonances). When the switch circuits SW 1 and SW 2 each are in the first connection state, resonant frequencies of the two resonances are respectively 1.785 GHz and 2.215 GHz, and a resonance whose resonant frequency is 1.785 GHz is a primary resonance. In addition, it can be further learned from FIG. 29 that, when the antenna system operates at the resonant frequency (1.785 GHz) of the primary resonance, isolation between antennas is better than that between antennas when the antenna system operates at another resonant frequency (2.215 GHz). When the switch circuits SW 1 and SW 2 each are in the second connection state, resonant frequencies of the two resonances are respectively 1.875 GHz and 2.05 GHz. A resonance whose resonant frequency is 1.875 GHz is a primary resonance. In addition, it can be learned from FIG. 29 that, when the antenna system operates at the resonant frequency (1.875 GHz) of the primary resonance, isolation between antennas is better than isolation generated when the antenna system operates at another resonant frequency (2.05 GHz).

It can be further learned from FIG. 29 that, when the switch circuits SW 1 and SW 2 each are in the first connection state, in a range of 1.85 GHz to 1.91 GHz, a value of S11 of the antenna system in this embodiment is about less than −6 dB; and when the switch circuits SW 1 and SW 2 each are in the second connection state, in ranges of 1.82 GHz to 1.95 GHz and 2 GHz to 2.08 GHz, a value of S11 of the antenna system in this embodiment is about less than −6 dB.

It should be noted that, in engineering, a value of S11 is generally −6 dB as a standard. When a value of S11 of an antenna is less than −6 dB, it may be considered that the antenna can operate normally, or it may be considered that transmit efficiency of the antenna is good.

In FIG. 30, a curve A1 indicates system efficiency of each antenna in the antenna system shown in FIG. 1 in this application, and a curve A2 indicates radiation efficiency of each antenna in the antenna system shown in FIG. 1 in this application. It can be learned from FIG. 30 that in a range of 1.85 GHz to 2 GHz and in the antenna system in this embodiment, when both a switch circuit SW 1 and a switch circuit SW 2 are in a first connection state, system efficiency of each antenna in the antenna system is about −4.5 dB to −5 dB, radiation efficiency is about −3.4 dB to −2.7 dB. In the antenna system in this embodiment, when both the switch circuit SW 1 and the switch circuit SW 2 are in a second connected state, system efficiency of each antenna in the antenna system is about −3 dB to −3.2 dB, and radiation efficiency is about −2 dB to −2.6 dB.

System efficiency of each antenna in the antenna system shown in FIG. 1 is about −7 dB to −5.2 dB, and radiation efficiency is about −4.9 dB to −4 dB.

It can be learned that, in a range of 1.85 GHz to 2 GHz, antenna efficiency of the antenna system provided in this embodiment is better than that of the antenna system shown in FIG. 1 of this application. Further, in this embodiment, antenna efficiency obtained when the switch circuits SW 1 and SW 2 each are in the second connection state is better than antenna efficiency obtained when the switch circuits SW 1 and SW 2 each are in the first connection state.

Figure 31:
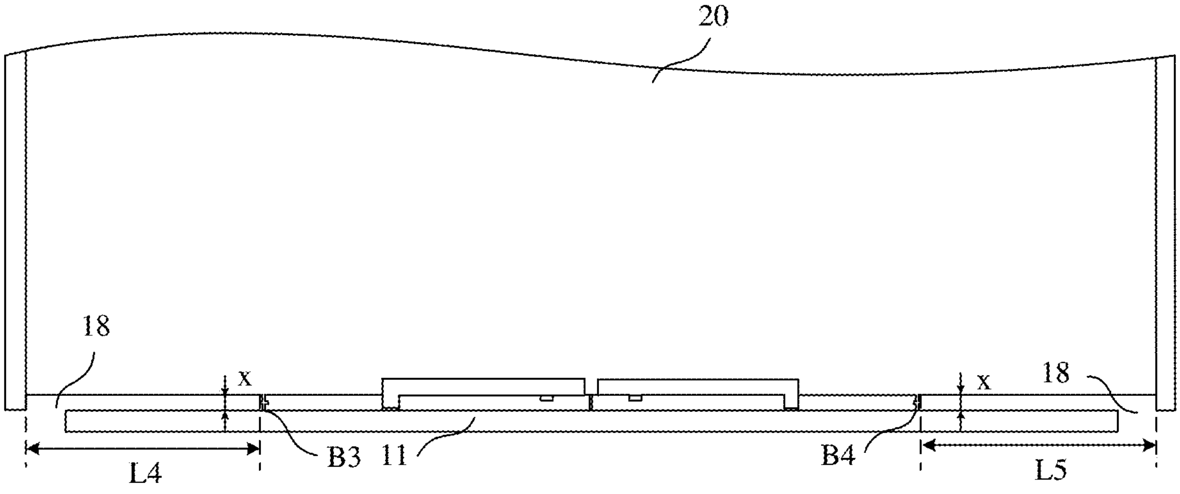
FIG. 31 is a schematic diagram of a three-dimensional structure of an antenna system according to an embodiment of this application.

FIG. 31 is a schematic diagram of a three-dimensional structure of an antenna system according to an embodiment. The structure of this embodiment is basically the same as that of the antenna system shown in FIG. 28*a*, and a difference lies in that:

Both the radiating stub 111 and the radiating stub extend in a direction parallel to the first radiator 11, and both the radiating stub 111 and the radiating stub 112 are located on a same side as the first radiator 11. In addition, no switch circuit is disposed between the first radiator 11 and the PCB board.

Certainly, a person skilled in the art may understand that, in another alternative implementation, a switch circuit may also be disposed between the first radiator 11 and the PCB board.

In another implementation, one of the radiating stub 111 and the radiating stub 112 is in an L shape, and the other one extends in a direction parallel to the first radiator 11. For the radiating stub in an L shape, a horizontal part of the radiating stub is located on a same side as the first radiator 12, and a vertical part of the radiating stub is located on a side adjacent to the first radiator. The other radiating stub and the first radiator 12 are located on a same side. It should be understood that the solution in FIG. 31 may be combined with the solutions in the foregoing embodiments.

This application further provides an electronic device, including the antenna system 1 in any one of the foregoing implementations.

Figure 32:
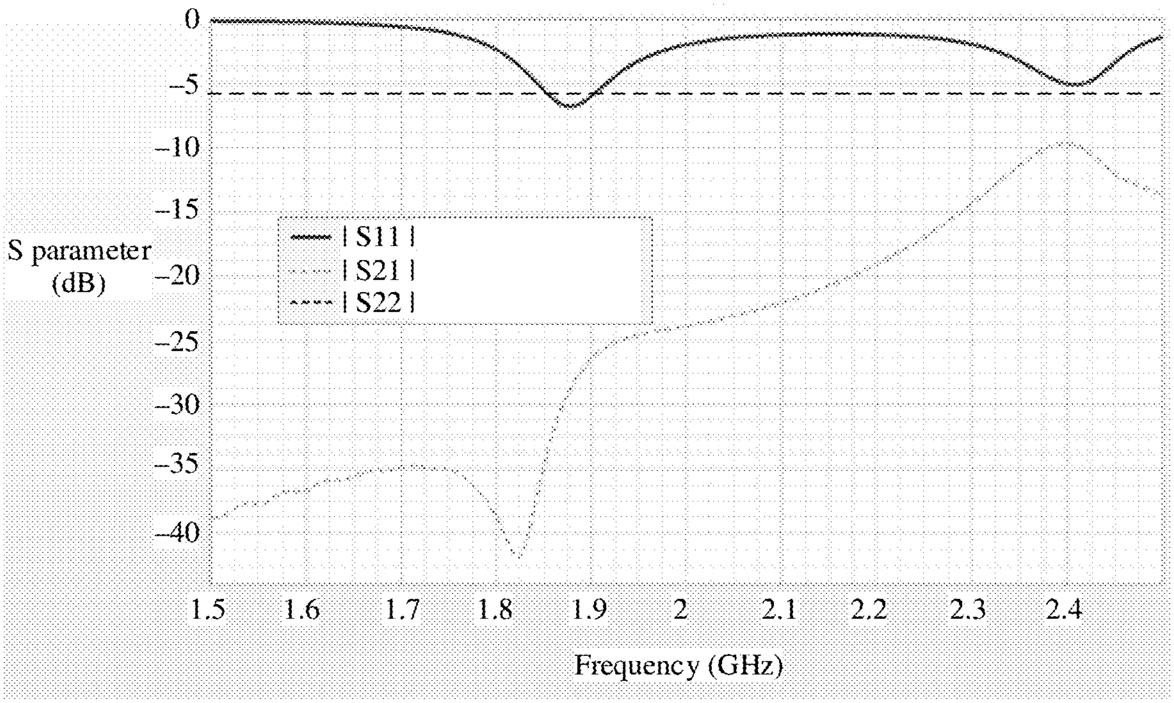
FIG. 32 is a curve diagram of an S parameter effect obtained by performing a simulation effect test on an antenna system according to an embodiment of this application.
Figure 33:
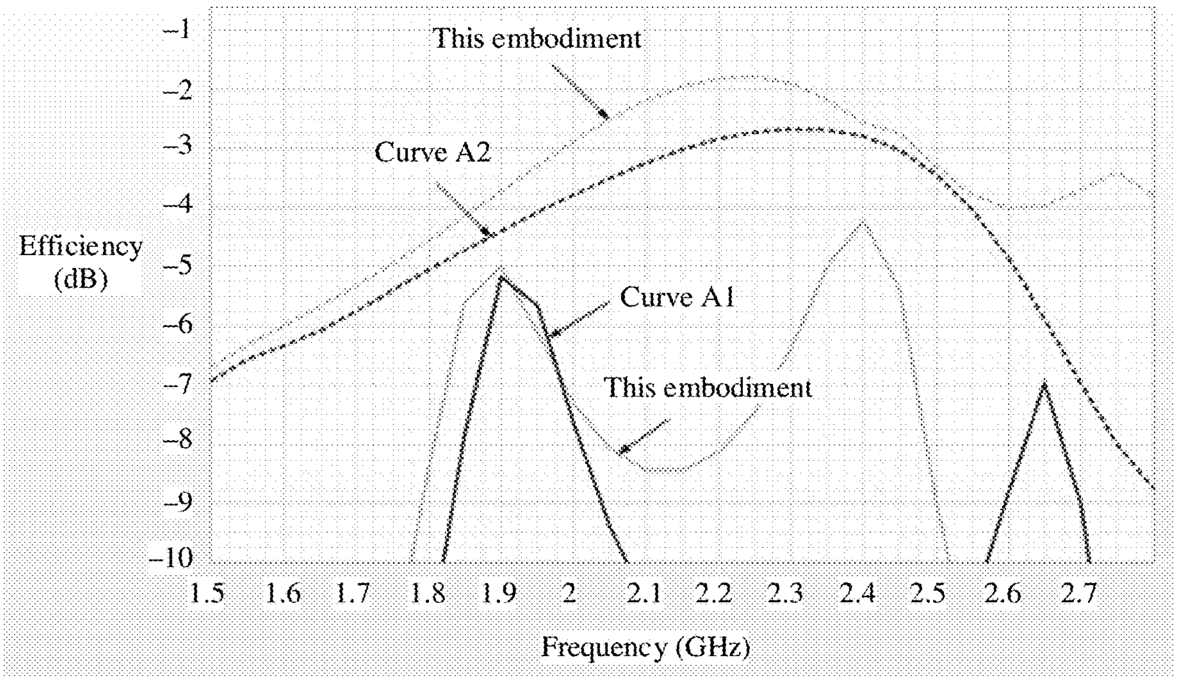
FIG. 33 is a curve comparison diagram of antenna efficiency obtained by performing a simulation effect test on an antenna system according to an embodiment of this application.

Simulation software is used to perform simulation analysis on the antenna system in this embodiment, and curve diagrams of effects shown in FIG. 32 and FIG. 33 are obtained.

Obtained simulation effect parameters of the curve diagrams shown in FIG. 32 and FIG. 33 are shown in Table 12 below (which is understood with reference to FIG. 31). A length and a width of a closed slit, a length and a width of a non-closed slit, a length of a gap, and a capacitance parameter in the antenna system are the same as those in the structure of the antenna system shown in FIG. 1 in this application. Therefore, for specific values, refer to Table 1 above.

TABLE 12

| Parameters | Values |
|---|---|
| Lengths of a slot 18: L4 and L5 (mm) | L4 = L5 = 17 |
| Width × of the slot 18 (mm) | 1 |

Refer to FIG. 32 and FIG. 33. FIG. 32 is a curve diagram of an S parameter effect obtained by performing a simulation effect test on an antenna system according to an embodiment of this application, and FIG. 33 is a curve comparison diagram of antenna efficiency obtained by separately performing a simulation effect test on the antenna system structure shown in FIG. 1 and an antenna system according to an embodiment of this application.

It can be learned from FIG. 32 that, in the antenna system provided in this embodiment, each antenna in the antenna system can generate two resonances (namely, double resonances), and resonant frequencies of the two resonances are respectively 1.75 GHz and 2.415 GHz. A resonance whose resonant frequency is 1.75 GHz is a primary resonance. In addition, it can be further learned from FIG. 32 that, when the antenna system operates at the resonant frequency (1.75 GHz) of the primary resonance, isolation between antennas is better than isolation generated when the antenna system operates at another resonant frequency (2.415 GHz). In a range of 1.85 GHz to 1.91 GHz, a value of S11 of the antenna system in this embodiment is about less than −6 dB.

In FIG. 33, a curve A1 indicates system efficiency of the antenna system shown in FIG. 1 in this application, and a curve A2 indicates radiation efficiency of the antenna system shown in FIG. 1 in this application. It can be learned from FIG. 33 that, in a range of 1.8 GHz to 1.9 GHz, antenna efficiency of the antenna system in this embodiment is about −8.8 dB to −5 dB, and radiation efficiency of the antenna system in this embodiment is about −4.6 dB to −3.8 dB. In addition, in the range of 1.8 GHz to 1.9 GHz, both the radiation efficiency and antenna efficiency of the antenna system provided in this embodiment are better than those of the antenna system shown in FIG. 1 of this application.

Figure 34:
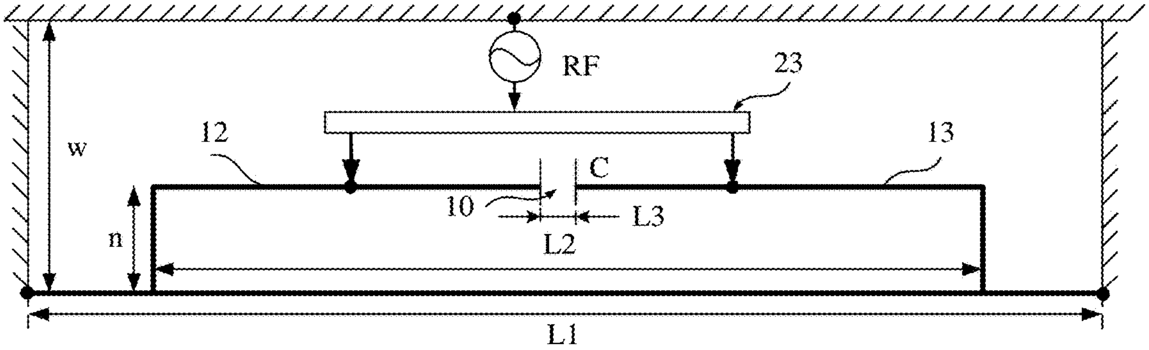
FIG. 34 is a schematic diagram of a principle structure of an antenna system according to an embodiment of this application.

FIG. 34 is a schematic diagram of a principle structure of an antenna according to an embodiment of this application. The structure of this embodiment is basically the same as that of the antenna system shown in FIG. 1 in this application, and a difference lies in that:

A second radiator 12 and a third radiator 13 are separately connected to a same radio frequency source RF via a duplexer 23. The second radiator 12 receives, through the duplexer 23, a first radio frequency signal output by the radio frequency source RF, and the third radiator 13 receives, through the duplexer 23, a second radio frequency signal output by the radio frequency source RF. In another alternative implementation, the duplexer 23 may also be a combiner, and does not limit the protection scope of this application herein. It should be understood that the solution in FIG. 34 may be combined with the solutions in the foregoing embodiments.

This application further provides an electronic device, including the antenna system in any one of the foregoing implementations.

Figure 35:
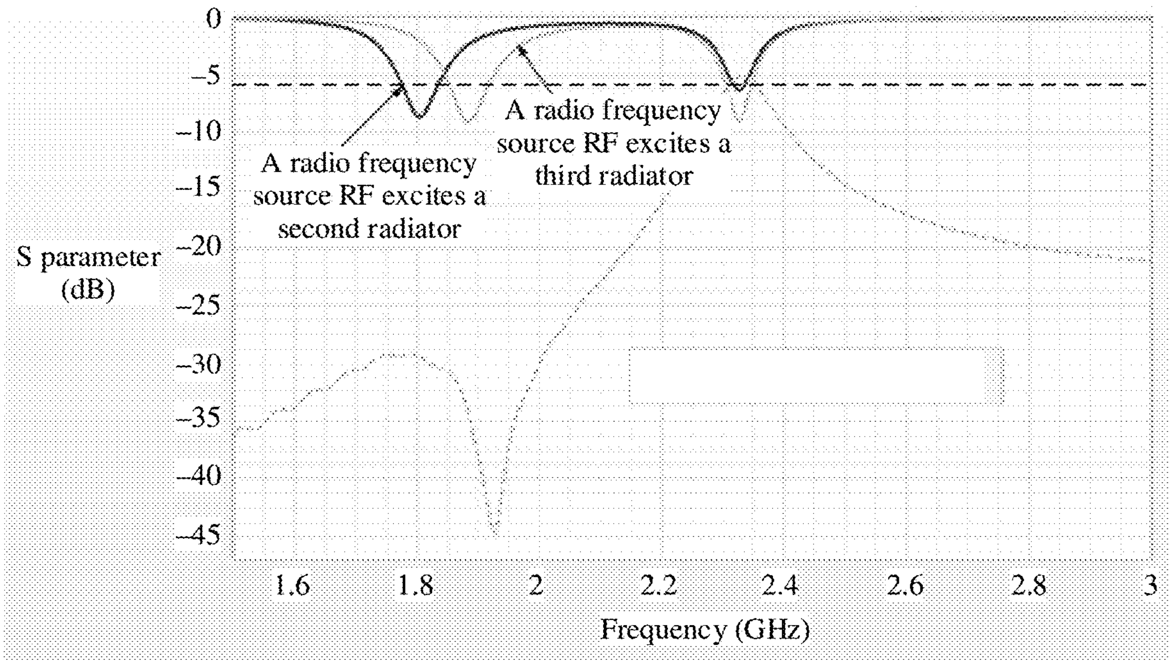
FIG. 35 and FIG. 36 are respectively curve diagrams of an S parameter effect and antenna efficiency that are obtained by performing simulation effect simulation on an antenna system according to this embodiment of this application.
Figure 36:
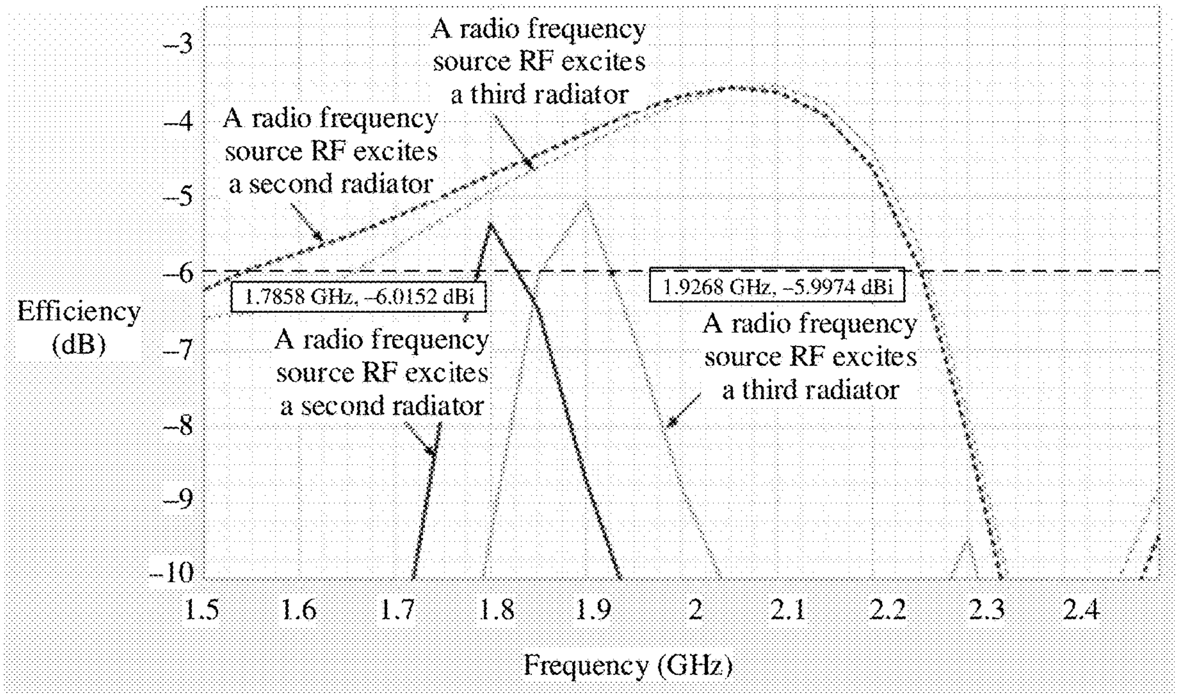

Simulation software is used to perform simulation analysis on the antenna system in this embodiment, and curve diagrams of effects shown in FIG. 35 and FIG. 36 are obtained.

For obtaining the simulation effect parameters of the curve diagrams shown in FIG. 35 and FIG. 36, refer to the foregoing Table 1 (which is understood with reference to FIG. 34).

FIG. 35 is a curve diagram of an S parameter effect obtained by performing simulation effect simulation on an antenna system in this embodiment, and FIG. 36 is a curve diagram of antenna efficiency obtained by performing simulation effect simulation on an antenna in this embodiment. It can be learned from FIG. 35 that, when a radio frequency source RF excites a second radiator, an antenna in this embodiment can generate a resonance at a frequency of 1.8 GHz. When the antenna operates at the frequency, a value of S21 of the antenna is −29 dB. When the radio frequency source RF excites a third radiator, the antenna in this embodiment can generate a resonance at a frequency of 1.845 GHz. When the antenna operates at the frequency, a value of S21 of the antenna is −35 dB. It can be learned that the antenna in this embodiment can ensure high isolation, so that the antenna generates two resonances (namely, double resonances). In addition, as shown in FIG. 35, in a range of 1.785 GHz to 1.825 GHz and a range of 1.85 GHz to 1.925 GHz, a value of S11 of the antenna in this embodiment is less than −6 dB.

It can be learned from FIG. 36 that, in a range of 1.75 GHz to 1.85 GHz, when a radio frequency source RF excites a second radiator, system efficiency of the antenna in this embodiment is about −6.2 dB to −5.5 dB, and radiation efficiency of the antenna is about −4.9 dB to −4.5 dB. In a range of 1.8 GHz to 1.95 GHz, when the radio frequency source RF excites a third radiator, system efficiency of the antenna in this embodiment is about −9.5 dB to −5 dB, and radiation efficiency of the antenna ranges from −4.9 dB to −4 dB. Further, it can be further learned that, in a range of 1.79 GHz to 1.825 GHz and a range of 1.85 GHz to 1.9 GHz, system efficiency of the antenna in this embodiment is greater than −6 dB. It can be learned that the antenna provided in this embodiment can implement a good antenna efficiency bandwidth.

It is clear that a person skilled in the art may make various modifications and variations to this application without departing from the spirit and scope of this application. Thus, this application is intended to cover such modifications and variations to this application, provided that the modifications and variations fall within the scope of the claims of this application and their equivalent technologies.

What is claimed is:

1. An antenna system, comprising:
- a first antenna, a second antenna, and a ground, wherein the first antenna comprises a first radiator and a second radiator, and wherein the second antenna comprises the first radiator and a third radiator,
- wherein two ends of the first radiator are separately electrically connected to the ground,
- wherein a first end of the second radiator is further away from a first end of the third radiator than a second end of the second radiator, and the first end of the third radiator is further away from the first end of the second radiator than a second end of the third radiator,
- wherein the first end of the second radiator and the first end of the third radiator are separately connected to or coupled to the first radiator, and the second end of the second radiator is disposed opposite a gap to the second end of the third radiator, and
- wherein the second radiator comprises a first feeding connection point, the antenna system feeds the first antenna through the first feeding connection point, the third radiator comprises a second feeding connection point, and the antenna system feeds the second antenna through the second feeding connection point.

2. The antenna system according to claim 1, wherein the antenna system further comprises a tuning component, wherein one end of the tuning component is connected to the first radiator, and wherein another end of the tuning component is connected to the ground, and
- wherein the tuning component comprises a capacitor or an inductor.

3. The antenna system according to claim 2, wherein the first radiator, the second radiator, the third radiator, and the gap form a non-closed slit, and wherein, in a length direction of the non-closed slit, a connection point formed by a connection of the tuning component to the first radiator is located between the first feeding connection point and the second feeding connection point.

4. The antenna system according to claim 1, wherein a capacitor is disposed at the gap, and wherein two ends of the capacitor are respectively connected to the second end of the second radiator and the second end of the third radiator.

5. The antenna system according to claim 1, wherein both the second radiator and the third radiator are in an L shape.

6. The antenna system according to claim 1, wherein:
- the second radiator is configured with one or more first slots; or
- the third radiator is configured with one or more second slots.

7. The antenna system according to claim 6, wherein a capacitor is disposed at at least one of the one or more first slots and the one or more second slots.

8. The antenna system according to claim 1, wherein the first radiator and the ground are enclosed to form a closed slit, and wherein a length of the closed slit is greater than or equal to ½ times a wavelength of the first antenna or the second antenna, and wherein the length of the closed slit is less than one time the wavelength of the first antenna or the second antenna.

9. A device, comprising an antenna system, the antenna system comprising:
- a first antenna, a second antenna, and a ground, wherein the first antenna comprises a first radiator and a second radiator, and wherein the second antenna comprises the first radiator and a third radiator,
- wherein two ends of the first radiator are separately electrically connected to the ground,
- wherein a first end of the second radiator is farther away from a first end of the third radiator than a second end of the second radiator, and the first end of the third radiator is farther away from the first end of the second radiator than a second end of the third radiator,
- wherein the first end of the second radiator and the first end of the third radiator are separately connected to or coupled to the first radiator, and
- wherein the second end of the second radiator is disposed opposite a gap to the second end of the third radiator, and
- wherein the second radiator comprises a first feeding connection point, the antenna system feeds the first antenna through the first feeding connection point, the third radiator comprises a second feeding connection point, and the antenna system feeds the second antenna through the second feeding connection point.

10. The device according to claim 9, wherein the antenna system further comprises a tuning component, wherein one end of the tuning component is connected to the first radiator, and wherein another end of the tuning component is connected to the ground, and wherein the tuning component comprises a capacitor or an inductor.

11. The device according to claim 10, wherein the first radiator, the second radiator, the third radiator, and the gap form a non-closed slit, and wherein, in a length direction of the non-closed slit, a connection point formed by a connection of the tuning component to the first radiator is located between the first feeding connection point and the second feeding connection point.

12. The device according to claim 9, wherein a capacitor is disposed at the gap, and wherein two ends of the capacitor are respectively connected to the second end of the second radiator and the second end of the third radiator.

13. The device according to claim 9, wherein both the second radiator and the third radiator are in an L shape.

14. The device according to claim 9, wherein the second radiator is configured with one or more first slots; or the third radiator is configured with one or more second slots.

15. The device according to claim 14, wherein a capacitor is disposed at at least one of the one or more first slots and the one or more second slots.

16. The device according to claim 9, wherein the first radiator and the ground are enclosed to form a closed slit, and wherein a length of the closed slit is greater than or equal to ½ times a wavelength of the first antenna or the second antenna, and wherein the length of the closed slit is less than one time the wavelength of the first antenna or the second antenna.

17. The device according to claim 9, wherein:

the first radiator is formed by a metal frame of the device or an embedded metal structure part embedded in the metal frame; and the second radiator and the third radiator are both formed by a metal structure part of the device, or the second radiator and the third radiator are both formed on a support of the device through a laser direct structuring process.

18. The device according to claim 9, wherein the first radiator is formed by a metal frame of the device, and wherein both the second radiator and the third radiator are formed by an embedded metal structure part embedded in the metal frame in the device.

19. The device according to claim 9, wherein the first radiator is formed by a metal battery cover of the device or a metal middle frame of the device, and wherein the second radiator and the third radiator are both formed by a metal frame of the device, or wherein the second radiator and the third radiator are both formed by an embedded metal structure part embedded in the metal frame, or wherein the second radiator and the third radiator are both formed on a support of the device through a laser direct structuring process.

* * * * *